(12) United States Patent
Hammack et al.

(10) Patent No.: US 8,896,603 B2
(45) Date of Patent: Nov. 25, 2014

(54) METHODS AND APPARATUS TO BIND PROPERTIES IN A PROCESS CONTROL SYSTEM

(75) Inventors: Stephen Gerard Hammack, Austin, TX (US); Bruce Hubert Campney, Manor, TX (US); Stephen Copps Gilbert, Austin, TX (US); John Michael Lucas, Leicestershire (GB)

(73) Assignee: Fisher-Rosemount Systems, Inc., Austin, TX (US)

( * ) Notice: Subject to any disclaimer, the term of this patent is extended or adjusted under 35 U.S.C. 154(b) by 1056 days.

(21) Appl. No.: 12/037,665

(22) Filed: Feb. 26, 2008

(65) Prior Publication Data
US 2009/0217200 A1  Aug. 27, 2009

(51) Int. Cl.
*G06T 11/20* (2006.01)
*G05B 19/042* (2006.01)
*G06F 9/44* (2006.01)

(52) U.S. Cl.
CPC ........ *G06F 8/34* (2013.01); *G05B 2219/25067* (2013.01); *G05B 19/0426* (2013.01); *G05B 2219/23258* (2013.01); *G05B 2219/23335* (2013.01); *G05B 2219/32095* (2013.01); *G05B 2219/23291* (2013.01); *G05B 2219/23174* (2013.01)
USPC ........... 345/440; 345/473; 715/810; 715/747; 715/762

(58) Field of Classification Search
CPC ...................... G05B 2219/32342; G06Q 10/06
USPC ................... 715/762, 810; 345/473
See application file for complete search history.

(56) References Cited

U.S. PATENT DOCUMENTS

| 5,168,441 | A | 12/1992 | Onarheim et al. |
| 5,920,846 | A | 7/1999 | Storch et al. |
| 6,198,480 | B1 | 3/2001 | Cotugno et al. |
| 6,330,006 | B1 * | 12/2001 | Goodisman ................... 715/762 |
| 6,775,674 | B1 | 8/2004 | Agassi et al. |
| 6,829,607 | B1 | 12/2004 | Tafoya et al. |
| 7,188,316 | B2 * | 3/2007 | Gusmorino et al. .......... 715/764 |
| 7,577,938 | B2 * | 8/2009 | Bent et al. ..................... 717/113 |

(Continued)

FOREIGN PATENT DOCUMENTS

| JP | 2005063245 | 3/2005 |
| JP | 2008503797 | 2/2008 |
| WO | 2005109122 | 11/2005 |
| WO | 2008/005446 | 1/2008 |

OTHER PUBLICATIONS

UK Search Report corresponding to Application No. GB0900942.4, dated Apr. 14, 2009, 3 pages.

(Continued)

*Primary Examiner* — William Titcomb
(74) *Attorney, Agent, or Firm* — Hanley, Flight and Zimmerman, LLC

(57) ABSTRACT

Example methods and apparatus to bind properties in a process control system are disclosed. A disclosed example method involves associating a binding type with a property of a configuration element. A plurality of values for the property are then retrieved based on the plurality of values being associated with the binding type. At least some of the plurality of values are presented to a user. The example method also involves receiving a user-selected value from the at least some of the plurality of property values and generating a binding reference to bind the user-selected value to the configuration element.

24 Claims, 17 Drawing Sheets

(56) References Cited

U.S. PATENT DOCUMENTS

| | | | |
|---|---|---|---|
| 7,680,546 B2 * | 3/2010 | Gilbert et al. | 700/17 |
| 7,702,409 B2 * | 4/2010 | Lucas et al. | 700/96 |
| 7,703,032 B2 * | 4/2010 | Wells | 715/771 |
| 7,802,194 B2 * | 9/2010 | Kol et al. | 715/765 |
| 7,814,433 B2 * | 10/2010 | Johanson et al. | 715/810 |
| 7,971,151 B2 * | 6/2011 | Nixon et al. | 715/771 |
| 8,144,150 B2 * | 3/2012 | Gilbert et al. | 345/440 |
| 2001/0004737 A1 | 6/2001 | Laux | |
| 2003/0229900 A1 | 12/2003 | Reisman | |
| 2003/0231211 A1 | 12/2003 | Shah et al. | |
| 2004/0031058 A1 | 2/2004 | Reisman | |
| 2004/0227776 A1 * | 11/2004 | Bent et al. | 345/700 |
| 2005/0198076 A1 | 9/2005 | Stata et al. | |
| 2005/0229150 A1 * | 10/2005 | Ronnewinkel | 717/101 |
| 2005/0234959 A1 | 10/2005 | Ronnewinkel et al. | |
| 2005/0257204 A1 | 11/2005 | Bryant et al. | |
| 2006/0150172 A1 * | 7/2006 | Heath et al. | 717/162 |
| 2006/0184925 A1 | 8/2006 | Ficatier et al. | |
| 2007/0044042 A1 * | 2/2007 | Jones et al. | 715/961 |
| 2007/0047522 A1 | 3/2007 | Jefferson et al. | |
| 2007/0074126 A1 | 3/2007 | Fisher et al. | |
| 2007/0139441 A1 * | 6/2007 | Lucas et al. | 345/619 |
| 2007/0165031 A1 * | 7/2007 | Gilbert et al. | 345/473 |
| 2007/0179641 A1 * | 8/2007 | Lucas et al. | 700/83 |
| 2007/0240069 A1 | 10/2007 | Eldridge et al. | |
| 2008/0066004 A1 * | 3/2008 | Blevins et al. | 715/771 |
| 2008/0189655 A1 * | 8/2008 | Kol et al. | 715/808 |
| 2011/0252355 A1 | 10/2011 | Nixon et al. | |

OTHER PUBLICATIONS

Extended European Search Report corresponding to Application No. 09153634.2, dated Apr. 1, 2010, 7 pages.

European Patent Office, "Examination Report," issued on Mar. 18, 2011, in European Patent Application No. 09153634.2, 5 pages.

Intellectual Property Office, "Examination Report," Great Britain application No. GB0900942.4, issued on Feb. 29, 2012, 3 pages.

Japanese Patent Office, "Notice of Reasons for Rejection," mailed on Jan. 22, 2013, in Japanese Patent Application No. 2009-017817, 3 pages.

Intellectual Property Office, "Examination Report," mailed on Feb. 15, 2013, in Great Britain Patent Application No. 0900942.4, 3 pages.

European Patent Office, "Communication pursuant to Article 94(3) EPC (Examination Report)," mailed on Mar. 26, 2013, in European Patent Application No. 09 153 634.2-1802, 7 pages.

State Intellectual Property Office of P.R. China, "The Notification of the Second Office Action," Chinese application No. 200910008683. 4, issued on Jun. 27, 2013, 3 pages.

State Intellectual Property Office of People's Republic of China, "Third Office Action," issued on Jan. 17, 2014, in connection with Chinese Application No. 200910008683.4 (3 pages).

State Intellectual Property Office of People's Republic of China, "Office Action," issued on Aug. 5, 2014, in connection with Chinese Application No. 200910008683.4 (6 pages).

* cited by examiner

METHODS AND APPARATUS TO BIND PROPERTIES IN A PROCESS CONTROL SYSTEM

FIELD OF THE DISCLOSURE

The present disclosure relates generally to process control systems and, more particularly, to methods and apparatus to bind properties in a process control system.

BACKGROUND

Process control systems, like those used in chemical, petroleum or other processes, typically include one or more process controllers and input/output (I/O) devices communicatively coupled to at least one host or operator workstation and to one or more field devices via analog, digital or combined analog/digital buses. The field devices, which may be, for example, valves, valve positioners, switches and transmitters (e.g., temperature, pressure and flow rate sensors), perform functions within the process such as opening or closing valves and measuring process parameters. The process controllers receive signals indicative of process measurements made by the field devices and/or other information pertaining to the field devices, use this information to implement a control routine via a control module, and then generate control signals that are sent over the buses or other communication lines to the field devices to control the operation of the process. In this manner, the process controllers may execute and coordinate control strategies using the field devices via the buses and/or other communication links communicatively coupling the field devices.

Process control systems are often configured to perform processes in accordance with control modules to produce products. Product designers or engineers prepare control modules during a design time and store the control modules to be used subsequently a plurality of times by a process control system. A control module typically includes configuration information to control process equipment (e.g., tanks, vats, mixers, boilers, evaporators, pumps, valves, etc.) to transfer, mix, etc. ingredients in a process control system to perform a process. To enable operation of a process control system, equipment or devices (e.g., pumps, valves, mixers, boilers, sensors, etc.) of the process control system must also be configured. Recipes and equipment configuration information associated with those recipes can be updated or revised many times as a process recipe changes and/or as equipment or devices in a process control system change. Whenever a change is made, a user must ensure that the change is made with a correct, valid value and must ensure that the change is properly made in every place the control module or configuration information is referenced.

SUMMARY

Example apparatus and methods to bind properties in a process control system are described. In accordance with a described example, a method involves associating a binding type with a property of a configuration element. A plurality of values for the property are then retrieved based on the plurality of values being associated with the binding type. At least some of the plurality of values are presented to a user. The example method also involves receiving a user-selected value from the at least some of the plurality of property values and generating a binding reference to bind the user-selected value to the configuration element.

In accordance with another described example, an apparatus includes a binding provider to retrieve a plurality of values for a property of a configuration element. The binding provider retrieves the plurality of values based on a binding type associated with the property. The apparatus also includes an element editor to present at least some of the plurality of values to a user. The element editor is further to receive a user-selected value from the at least some of the plurality of property values and generate a binding reference to bind the user-selected value to the configuration element.

DETAILED DESCRIPTION

Figure 1:
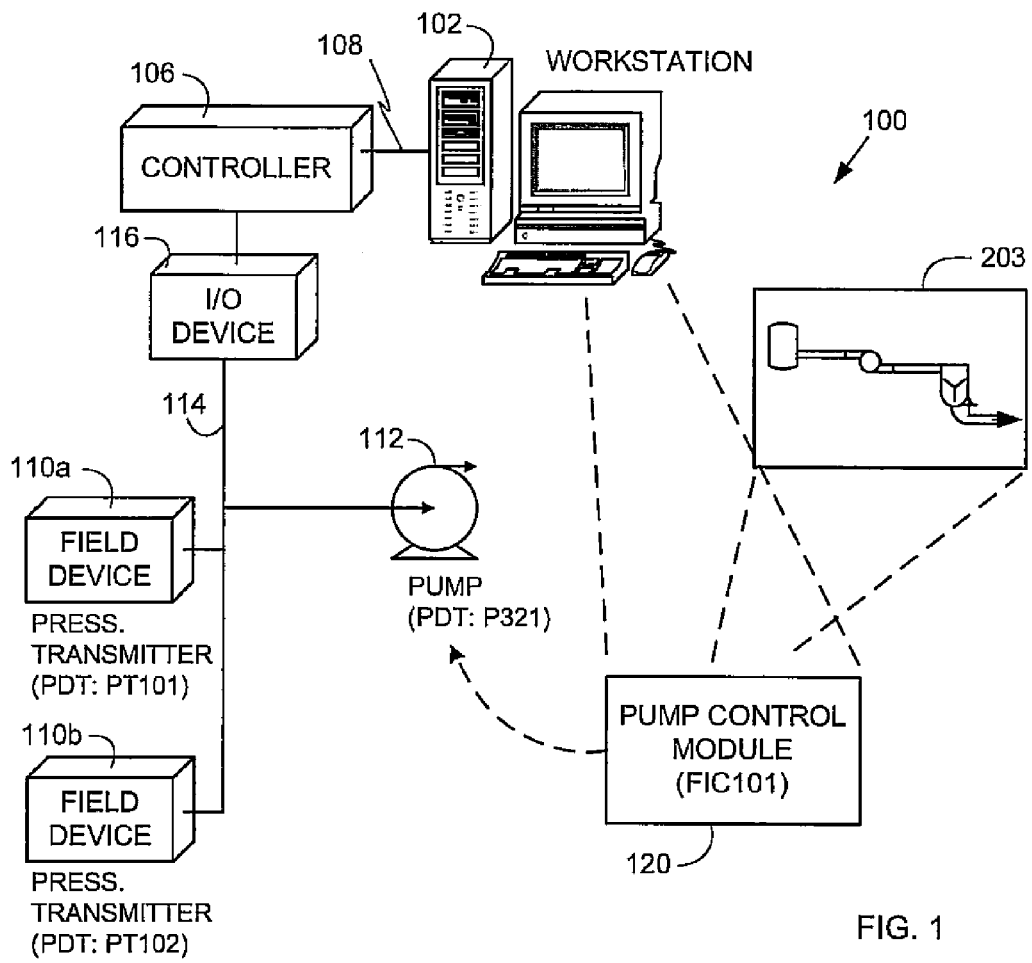
FIG. 1 is a block diagram illustrating an example process control system.

Although the following describes example methods and apparatus including, among other components, software and/or firmware executed on hardware, it should be noted that these examples are merely illustrative and should not be considered as limiting. For example, it is contemplated that any or all of the hardware, software, and firmware components could be embodied exclusively in hardware, exclusively in software, or in any combination of hardware and software. Accordingly, while the following describes example methods and apparatus, persons of ordinary skill in the art will readily appreciate that the examples provided are not the only way to implement such methods and apparatus.

The example methods and apparatus described herein can be used to bind values to properties of elements or methods used to implement control strategies in a process control system. In particular, the example methods and apparatus can be implemented by enabling users to associate binding type information with elements or methods of a control strategy environment in which the binding type information is used to categorize or segment a plurality of possible values that can be bound to a particular property of an element or method into subsets or different groups of values based on the binding types. Associating binding types with elements or methods enables substantially reducing or eliminating the possibility that users will enter incorrect or invalid values for properties of the elements or methods. For instance, when a user attempts to set or change a value of a property, the property field can automatically suggest only values associated with a binding type of that property. In addition, the example methods and apparatus described herein can also be used to validate user-provided property values to ensure that they are valid based on the binding types associated with the respective properties of the property values to generate valid binding references (e.g., valid binding references that will resolve to a valid control module or other valid target). The example methods and apparatus described herein can also be used to track changes to property values of configuration elements (e.g., graphic elements) when, for example, such changes are made outside of an editor environment for those configuration elements or methods. In this manner, any subsequent instantiation of those configuration elements or methods will include the updated property values.

The example methods and apparatus are described herein in connection with a human machine interface (HMI) used to implement a graphic editor via which a user can create and/or edit property values of a graphic representative of a device, equipment, or a graphic in a process control system. The HMI provides a graphical user interface via which the user can design a graphic from one or more shapes to represent a process control device or equipment and set different properties of the graphic to enable monitoring and/or controlling a process via a control module configured using the graphic. The example methods and apparatus are described herein as being used to bind process control modules of a process control system to graphic representations of process control system devices or equipment or functions of a process control system. Process control system devices may be, for example, field devices (e.g., pressure sensors, temperature sensors, valve controllers, level sensors, etc.), process control equipment (e.g., mixers, pumps, valves, boilers, heat exchangers, furnaces, etc.), control devices (e.g., controllers, programmable logic controllers (PLC's), distributed control system (DCS) controllers, input/output (I/O) devices, etc.), etc. The example methods and apparatus described herein may be configured to use an auto-suggestion process to provide a user (e.g., an engineer, a programmer, etc.) with names or identifiers of process control modules available for binding with a device or equipment graphic element based on a particular binding type associated with that graphic element while the user is defining or configuring the graphic element in a graphic editor environment. In addition to or instead of the auto-suggestion process, an auto-complete process, an INTELLISENSE® technology process or any other suitable process may be used to present control module names or identifiers based on binding types as described herein. In addition, the example methods and apparatus described herein can be used to automatically change process control module name or identifier values in different graphic elements when those values are subsequently changed outside of a graphic editor environment. In this manner, graphic elements can remain bound to the correct, respective control modules.

In known user interface displays for process control systems, there are many places in which a user must enter text when, for example, creating, configuring, or defining a process control routine. For example, when a user selects or creates a process equipment graphic element on a screen that is representative of process equipment (e.g., a pump, a mixer, a heater, etc.), the user is provided with the option to define the graphic element's name, tooltip description, and/or other information. Often these values are stored using strings, or in some instances the values provided during configuration or definition times are more than simple strings. In any case, when no configuration validation is performed to ensure that the provided strings are valid, there is no assurance that the intended configuration will be implemented.

Unlike known techniques used to configure process control systems, the example methods and apparatus described herein can be used to provide relatively more assurances than known techniques that user-provided information is valid to generate valid process control routines, recipes, etc. For instance, if a user creates a pump graphic and associates a particular control module binding type to the pump graphic, the example methods and apparatus described herein can be used to suggest or present the user with a list of control module name or identifier values available for binding with the selected pump graphic based on the user-specified control module binding type associated with the graphic. In this manner, the user is prevented from binding incorrect or invalid control modules with a device or equipment graphic element (e.g., control modules that do not exist or are incompatible with the device or equipment graphic element) that may create an invalid graphical configuration. In addition, to maintain the validity of graphical representations of the process control routines, the example methods and apparatus described herein can be used to detect when the name or identifier of a control module is changed or renamed (e.g., outside of a graphic editor) and update the control module, device, or equipment name or identifier in corresponding graphics bound to that identifier. When a corresponding graphic element is subsequently loaded in a graphic editor or in a control's graphical HMI runtime software, the bound to control module identifier value to which it is bound will be updated to maintain the validity of the binding between the graphic element and the control module. In this manner, users need not manually inspect and reconfigure each process device graphic element to update the names of control module identifier values to which those graphic elements should be bound.

Although the below describes the example methods and apparatus in connection with control modules, the example methods and apparatus can also be used in connection with recipes (e.g., batch recipes). In the illustrated examples described herein, a control module is a process or operation that operates in a looping or continuous manner until it is stopped by an external action (e.g., by an operator or by a recipe process), while a recipe (e.g., a batch recipe) is a process having a starting point and an ending point. For example, when a control module finishes a particular sequence of operations in accordance with its configuration, the control module loops back to the beginning and re-executes the operations. On the other hand, when a recipe has reached a particular goal (e.g., the recipe has finished making a particular batch of paint) in accordance with its configuration, the recipe stops.

Now turning to FIG. 1, an example process control system 100 that may be used to implement the example methods and apparatus described herein includes a workstation 102 (e.g., an application station, an operator station, etc.) and a controller 106, both of which may be communicatively coupled via a bus or local area network (LAN) 108, which is commonly referred to as an application control network (ACN). The LAN 108 may be implemented using any desired communication medium and protocol. For example, the LAN 108 may be based on a hardwired or wireless Ethernet communication scheme, which is well known and, thus, is not described in greater detail herein. However, as will be readily appreciated by those having ordinary skill in the art, any other suitable communication medium and protocol could be used. Further, although a single LAN is shown, more than one LAN and appropriate communication hardware within the workstation 102 may be used to provide redundant communication paths between the workstation 102 and another similar workstation (not shown).

The workstation 102 may be configured to perform operations associated with one or more information technology applications, user-interactive applications, and/or communication applications. For example, the workstation 102 may be configured to perform operations associated with process control-related applications and communication applications that enable the workstation 102 and the controller 106 to communicate with other devices or systems using any desired communication media (e.g., wireless, hardwired, etc.) and protocols (e.g., HTTP, SOAP, etc.). The workstation 102 may be implemented using any suitable computer system or processing system (e.g., the processor system 2010 of FIG. 20). For example, the workstation 102 could be implemented using a single processor personal computer, single or multi-processor workstations, etc.

The controller 106 may perform one or more process control routines that have been generated by a system engineer or other system personnel using the workstation 102 or any workstation and which have been downloaded to and instantiated in the controller 106. The controller 106 may be, for example, a DeltaV™ controller sold by Fisher-Rosemount Systems, Inc. and Emerson Process Management™. However, any other controller could be used instead. Further, while only one controller is shown in FIG. 1, additional controllers of any desired type or combination of types can be coupled to the LAN 108.

The controller 106 may be coupled to a plurality of process control devices including field devices 110a-b and a pump 112 via a digital data bus 114 and an input/output (I/O) device 116. During execution of a process control routine, the controller 106 may exchange information (e.g., commands, configuration information, measurement information, status information, etc.) with the field devices 110a-b and the pump 112. For example, the controller 106 may be provided with a process control routine that, when executed by the controller 106, causes the controller 106 to send commands to the field devices 110a-b and the pump 112 that cause the field devices 110a-b and the pump 112 to perform specified operations (e.g., perform a measurement, open/close a valve, enable/disable, etc.) and/or to communicate information (e.g., measurement data) via the digital data bus 114.

In the illustrated example of FIG. 1, a pump control module 120 is configured at the workstation 102 to define properties and configuration information to control and/or interface with the pump 112 so that the pump 112 can be controlled via the control module 120 to implement process control routines executed by the controller 106. To identify the control module 120, it is provided with a name or identifier value (i.e., an identifier value) of FIC101. In the illustrated example, although the field devices 110a-b are shown as pressure transmitters, they may be any other type of device including other types of sensors or measurement devices, actuators, etc. In addition, in the illustrated example, the pump 112 may be referred to as equipment. Equipment may also include, for example, tanks, vats, mixers, boilers, heaters, etc. However, for purposes of discussion herein, the terms device and equipment are used interchangeably.

In the illustrated example, the devices 110a-b and 112 are Fieldbus compliant devices configured to communicate via the digital data bus 114 using the well-known Fieldbus protocol. In accordance with the Fieldbus standard, the digital data bus 114 is a digital, two-way, multi-drop communication bus configured to be communicatively coupled to measurement and control devices (e.g., the devices 110a-b and 112). The devices 110a-b and 112 are shown communicatively coupled to the digital data bus 114 in a multi-drop configuration. The digital data bus 114 or similar data buses may alternatively be used to communicatively couple field devices to the I/O device 116 using a point-to-point configuration in which one field device is afforded exclusive use of a digital data bus to communicate with the I/O device 116. In alternative example implementations, the methods and apparatus may be used in connection with other types of field devices (e.g., Profibus or HART compliant devices that communicate via the data bus 114 using the well-known Profibus and HART communication protocols), which may or may not include Fieldbus-compliant devices.

In the illustrated example, the I/O device 116 is implemented using an I/O subsystem interface that enables connecting the controller 106 and the devices 110a-b and 112 to other field devices, which may use the Fieldbus protocol or other types of communication protocols (e.g., Profibus protocol, HART protocol, etc.). For example, the I/O device 116 may include one or more gateways that translate between the Fieldbus protocol and other communication protocols. Additional I/O devices (similar or identical to the I/O device 116) may be coupled to the controller 106 to enable additional groups of field devices to communicate with the controller 106.

The example process control system 100 is provided to illustrate one type of system within which the example methods and apparatus described in greater detail below may be advantageously employed. However, the example methods and apparatus described herein may, if desired, be advantageously employed in other systems of greater or less complexity than the example process control system 100 shown in FIG. 1 and/or systems that are used in connection with process control activities, enterprise management activities, communication activities, etc.

Figure 2:
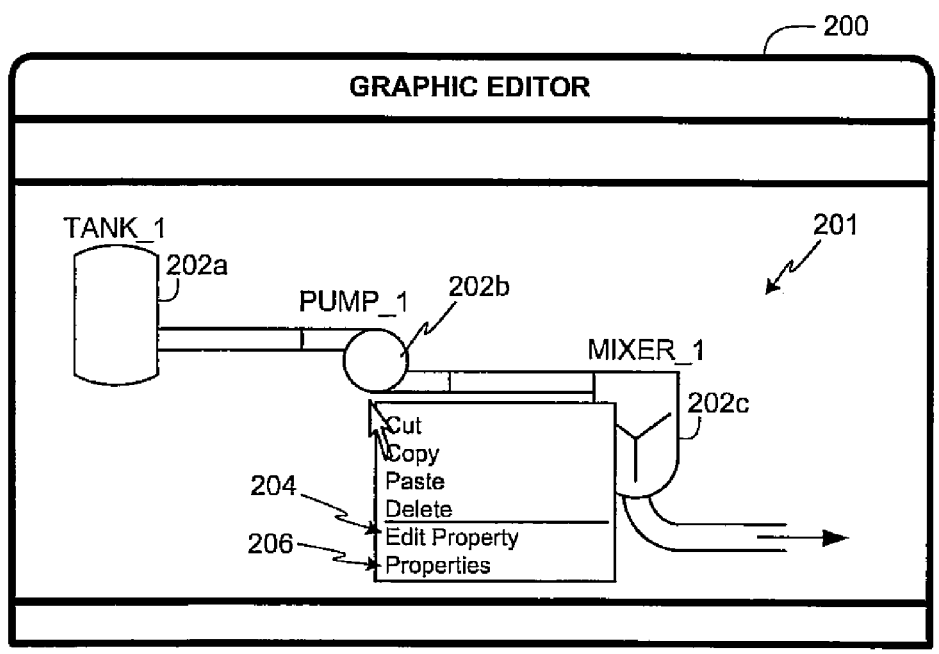
FIG. 2 depicts an example graphical user interface (GUI) including graphic elements representative of process control equipment of the example process control system of FIG. 1 and interconnections between the graphic elements.

FIG. 2 depicts an example editor graphical user interface (GUI) 200 that may be used to create and/or edit a graphic configuration 201 including process equipment graphic elements 202a-c representative of process control devices of the example process control system 100 of FIG. 1 and interconnections between the graphic elements 202a-c. Creating the graphic configuration 201 instantiates a control configuration 203 in the pump control module 120 of FIG. 1 to monitor and change set point values and/or other parameters for the pump control module 120. In the illustrated example, each of the process equipment graphics 202a-c may be implemented using a single shape graphic or a composite shape graphic. For example, some process equipment graphics (e.g., the process equipment graphics 202a-c) may be created by a user by enabling the user to select from different shapes in the editor GUI 200 and arranging the shapes to be representative of corresponding process equipment. Other process equipment graphics may be predefined and packaged with process control software so that users can select from the predefined graphics without having to make their own. The process equipment graphics 202a-c may be interconnected by a user (e.g., an engineer, an operator, etc.) using a GUI-based design software application executed by, for example, the workstation 102. In the illustrated example, the name of the tank graphic 202a is TANK_1, the name of the pump graphic 202b is PUMP_1, and the name of the mixer graphic 202c is MIXER_1. Each of the process equipment graphics 202a-c can be selected by a user to edit property definitions or property values of that graphic. For example, clicking on the pump graphic 202b causes the editor GUI 200 to display an 'Edit Property' option 204 and a 'Properties' option 206.

Figure 3:
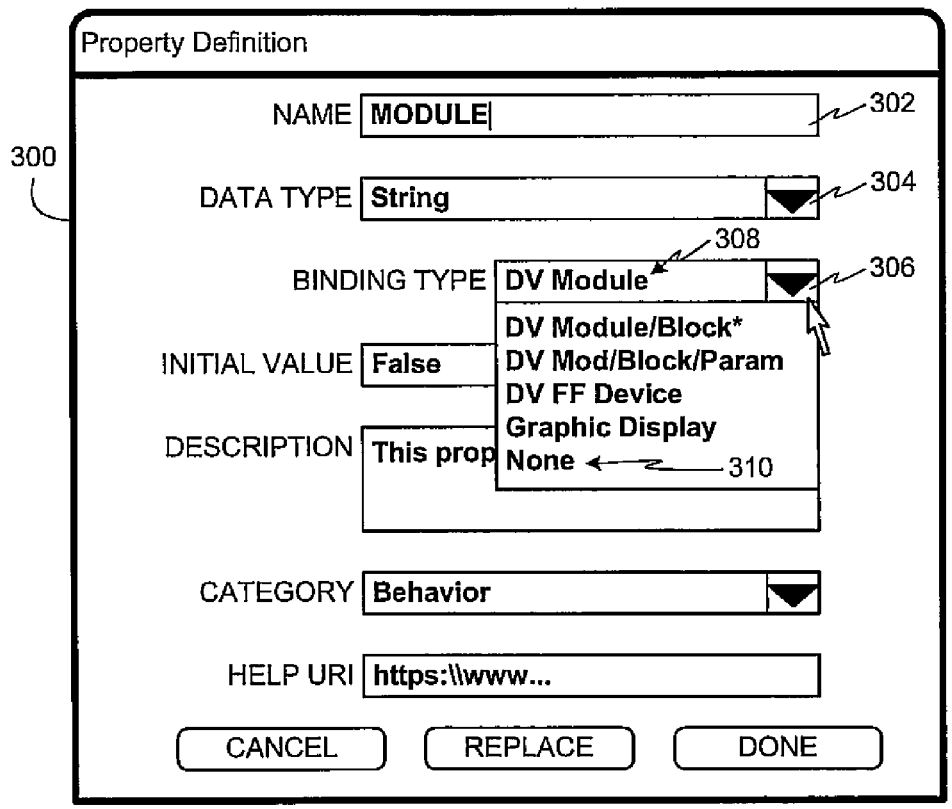
FIG. 3 is an example property definition user interface used to create and define properties of a graphic element.

In the illustrated example, selecting the 'Edit Property' option 204 causes the editor GUI 200 to display an example property definition user interface (UI) 300 of FIG. 3 that may be used to define or edit a property of the pump graphic 202b. In the illustrated example, the graphic configuration 201 (and, thus, the control configuration 203 of FIG. 1) can be created once and subsequently used a plurality of times with the pump control module 120 of FIG. 1 and/or with other control modules. For example, a user may create a module property to bind the pump graphic 202b to, for example, the control module 120 (FIG. 1) to interact with the pump 112 via the pump graphic 202b. Selecting the 'Properties' option 206 causes the editor GUI 200 to display an example properties user interface 400 of FIG. 4 that may be used to configure properties of the pump graphic 202b (FIG. 2) including, for example, a property created via the property definition user interface 300 of FIG. 3.

Turning to FIG. 3, the example property definition UI 300 includes a name field 302, a data type field 304, and a binding type field 306. In the illustrated example, the name field 302 is implemented using a text box control, and the data type field 304 and the binding type field 306 are implemented using drop-down list controls. The name field 302 can be used by a user to provide a name for a property being defined for the pump graphic 202b. In the illustrated example, the property name provided is 'MODULE' which refers to the property being defined as one used to bind a control module (e.g., the control module 120 of FIG. 1 or any other control module) to the pump graphic 202b. The data type field 304 can be used to specify a data type that should be used to store the name specified in the name field 302 in a memory.

The binding type field 306 can be used to specify a type of module to which the pump graphic 202b (FIG. 2) should be bound. In the illustrated example, the pump control module 120 of FIG. 1 is a DeltaV module and, thus, to work with the pump control module 120, the binding type specified in the binding type field 306 is 'DV Module' 308. The bindings between graphics and control modules described herein are used to create links or associations between the graphics (e.g., the graphics 202a-c of FIG. 2) and the control modules (e.g., the pump control module 120 of FIG. 1) so that the graphics can be used to create process control system configurations that can be used to control and monitor physical devices or equipment (e.g., the devices 110a-b and the pump 112) in a process control system via their respective control modules.

To substantially reduce or eliminate user entry of control module identifier values (e.g., FIC101, FIC102, Flow-Reactor, etc.) that are incorrect or invalid to form a particular valid binding, the binding types specified via the binding type field 306 of the example property definition UI 300 can be used to subsequently suggest control module identifiers of only control modules compatible with the specified binding type. For example, referring to FIG. 4, when a user configures the pump graphic 202b via the properties user interface 400, the user can use a property value field 402 to specify a control module identifier (e.g., FIC101, FIC102, etc.) of a control module associated with the process control system 100 of FIG. 1 to bind the pump graphic 202b with the control module corresponding to the specified control module identifier. In the illustrated example, the property value field 402 is a control module identifier field 402 for a MODULE property 404 defined in the property definition UI 300.

Figure 4:
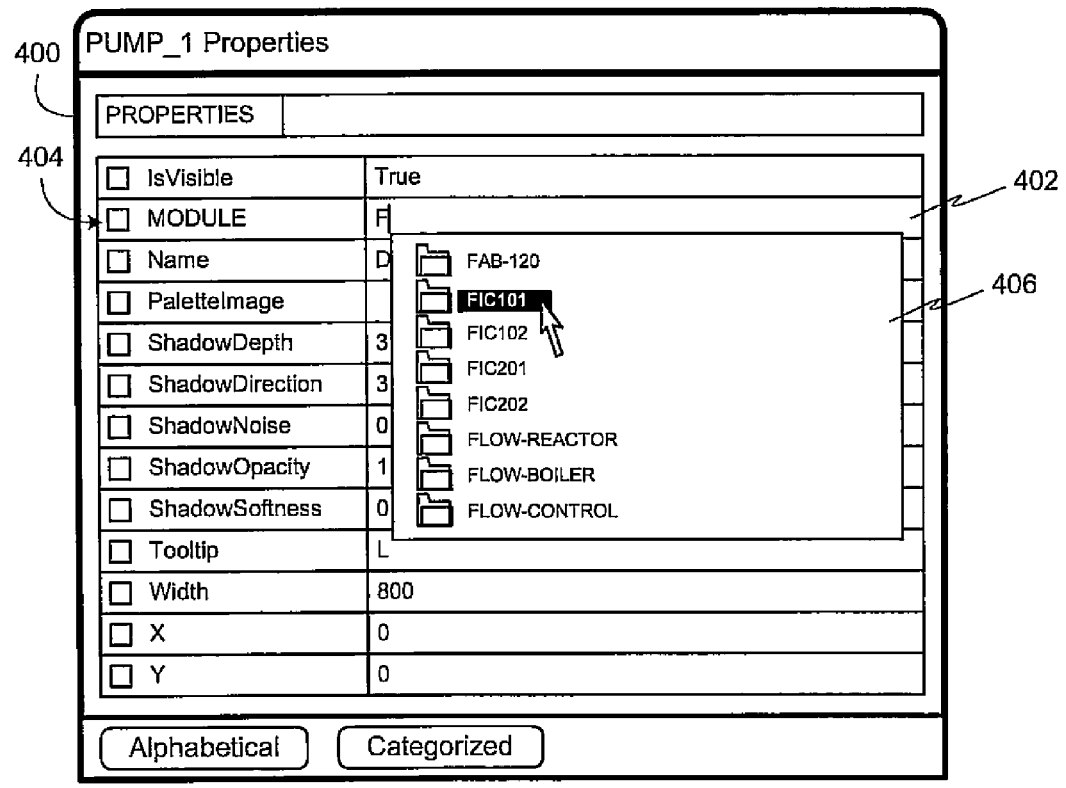
FIG. 4 is an example graphic element properties user interface used to configure properties of a graphic element.

As shown in FIG. 4, when a user begins typing in the control module identifier field 402, an auto-suggestion drop-down list 406 is displayed including suggestions or binding hints of identifiers corresponding to control modules that can be bound to the pump graphic 202b. The control module identifiers in the auto-suggestion drop-down list 406 are filtered and provided based on the binding type specified in the binding type field 306 of FIG. 3. In this manner, a user cannot select an invalid or non-existing identifier. In the illustrated example, the identifier value FIC101 is selected in the auto-suggestion drop-down list 406 for the MODULE property 404.

In some instances, a user may elect to specify 'None' 310 in the binding type field 306 of FIG. 3. When no binding type is specified (i.e., when 'None' 310 is specified), the user can enter any identifier in the control module identifier field 402 of FIG. 4. That is, no binding type filtering protection is provided to prevent a user from entering an invalid or non-existing identifier. Thus, if a user enters a non-existing identifier or an identifier of a control module that is not valid for generating a valid binding reference that will resolve to bind the control module with a particular graphic, the resulting graphic configuration may be invalid and may not function as intended.

Figure 5:
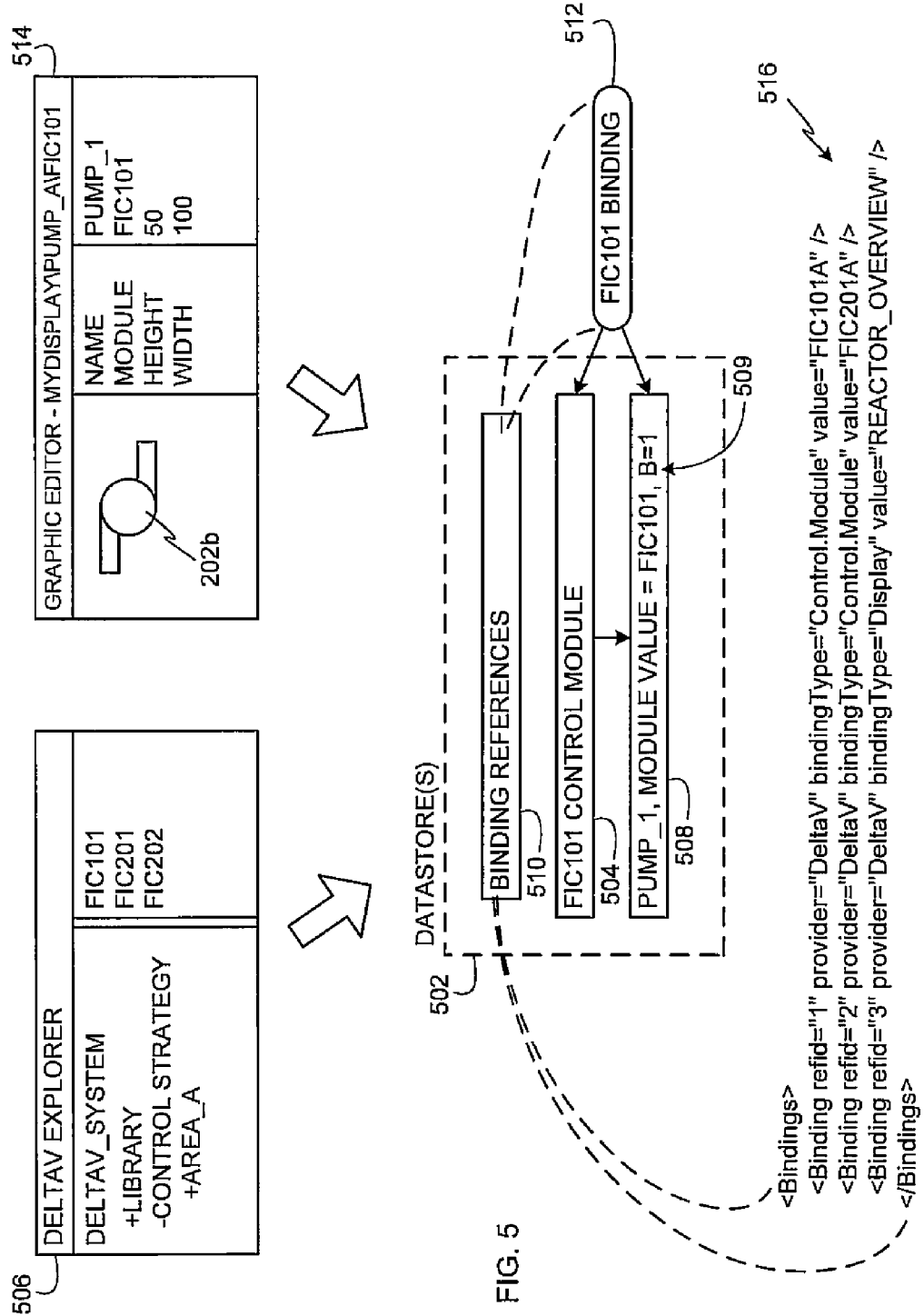
FIGS. 5 and 6 depict an example naming and renaming technique that may be used to track and propagate changes to values referred to by a property of a graphic element.
Figure 6:
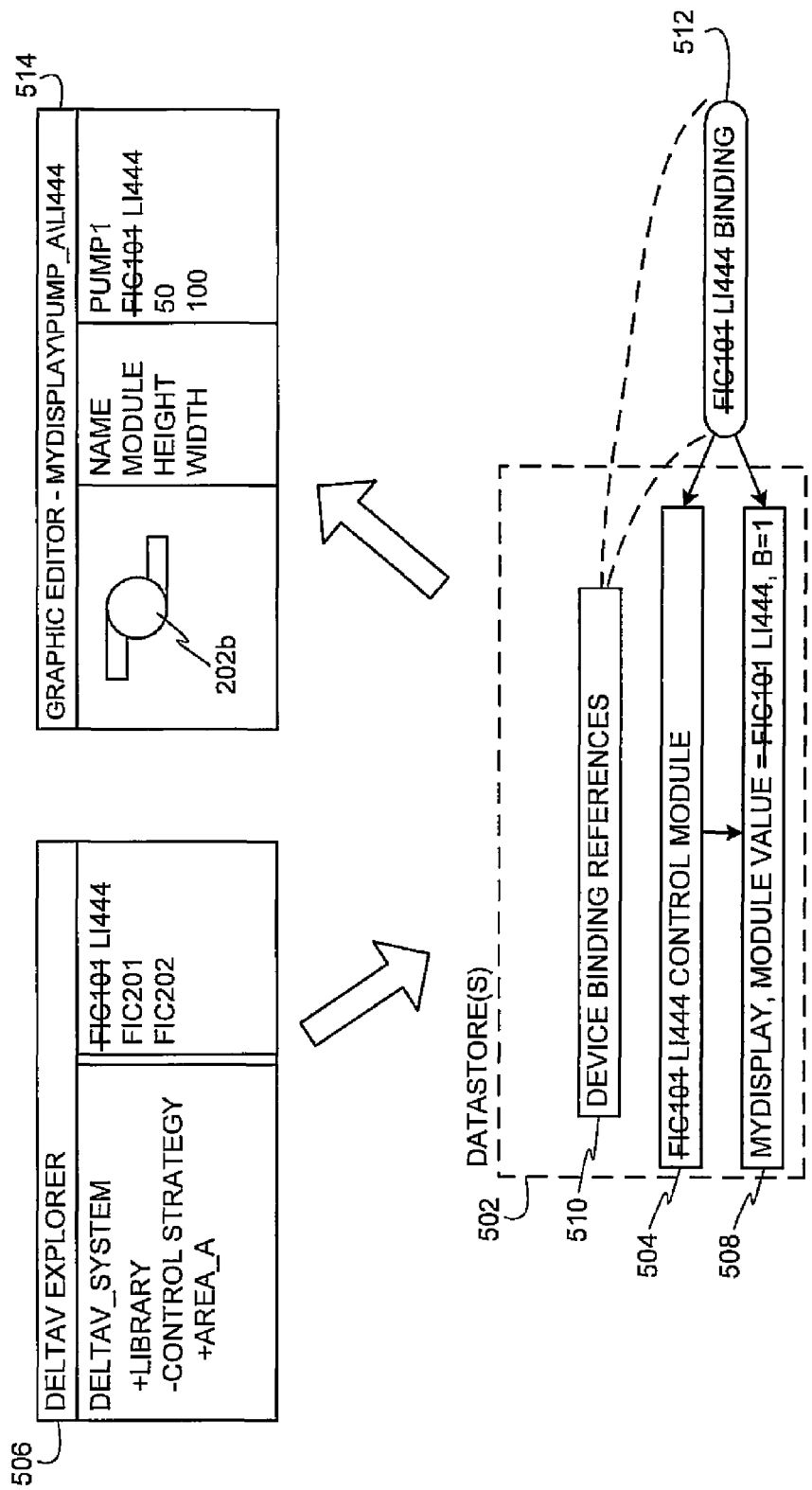

FIGS. 5 and 6 depict an example naming and renaming technique that may be used to track and propagate changes to values referred to by a property of device or equipment graphic elements. In the illustrated example of FIGS. 5 and 6, the name and renaming technique is used to detect when the control module identifier value of a control module (e.g., the identifier FIC101 of the control module 120 of FIG. 1) is changed outside of a graphic editor user interface (e.g., the graphic editor UI 200 of FIG. 2) and to propagate the identifier change to the pump graphic 202b to ensure that the pump graphic 202b includes the updated control module identifier value so that the binding between the control module and the graphic remains valid. In the illustrated example, one or more datastore areas 502 (e.g., one or more databases) are configured to store control module information, graphic property definition information, and binding information used to bind control modules (e.g., the control module 120 of FIG. 1) to respective graphics (e.g., the graphics 202*a-c* of FIG. 2). For example, referring to FIG. 10, the datastore areas 502 may include a binding information datastore 1010 and/or a graphic datastore 1020. The example datastore areas 502 may be stored in any processor system or server of the process control system 100 and/or communicatively coupled to the process control system 100.

To store control module information, the example datastore areas 502 store a plurality of control module data records or entries, one of which is shown and indicated by reference numeral 504. In the illustrated example, the FIC101 control module data record 504 is used to store configuration and property information corresponding to the FIC101 pump control module 120 of FIG. 1 associated with the pump 112 (FIG. 1). In the illustrated example, the FIC101 control module data record 504 can be viewed by a user via an explorer user interface 506 (e.g., a module explorer and/or selection user interface). In this manner, a user can build a recipe or control strategy using one or more instances of the control module 120 (FIG. 1).

To store configuration information corresponding to device or equipment graphics, the example datastore areas 502 store a plurality of graphic configuration records, one of which is shown and indicated by reference numeral 508. In the illustrated example, the graphic configuration data record 508 is used to store configuration information corresponding to the graphic 202*b* named 'PUMP_1' and shown in a graphic editor user interface 514. The property values provided by a user via the graphic properties user interface 400 (FIG. 4) and/or the graphic editor user interface 514 can be stored in the graphic configuration data record 508. In the illustrated example, the graphic configuration data record 508 is shown as storing the module control identifier value FIC101 in association with the MODULE property (i.e., the MODULE property 404 of FIG. 4). The graphic configuration data record 508 also includes a bound flag ('B') 509 used to indicate whether the graphic configuration data record 508 is bound or unbound to a control module (e.g., the control module 120 of FIG. 1). In the illustrated example, the bound flag 509 is set to one ('1') indicating that the graphic configuration data record 508 is bound. When a graphic configuration data record (e.g., the graphic configuration data record 508) and, thus, a corresponding graphic (e.g., the pump graphic 202*b* of FIGS. 2 and 5) is not bound, its bound flag (e.g., the bound flag 509) is set to zero ('0') and the graphic configuration data record is placed in an unbound list.

Figure 7:
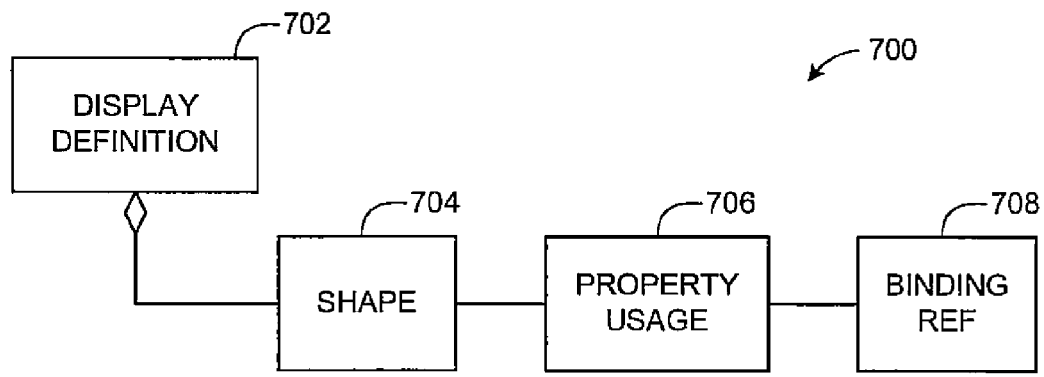
FIG. 7 depicts an example class diagram showing how a binding reference can be represented using a display definition class.

To track which control modules (e.g., the control module 120 of FIG. 1) are bound to which equipment graphic elements (e.g., the graphics 202*a-c* of FIG. 2), the example datastore areas 502 include a plurality of binding reference data records 510. Each of the binding references 510 includes a binding reference ID, a binding type, a binding provider name, and a binding value (e.g., FIC101, FIC102, etc.). The binding reference ID, which may not be displayed to a user, is used to access and track each of the binding references 510 and associate each of the binding references 510 to a respective device or equipment graphic (e.g., the graphics 202*a-c* of FIG. 2). The binding type is used to specify a particular type of binding such as, for example, a binding type available for entry in the binding type field 306 of FIG. 3. The binding provider name is the name of a particular binding provider (e.g., the binding provider 902 described below in connection with FIG. 9) used to provide a particular binding type for selection by a user. The binding value is an identifier of a particular control module (e.g., the control module identifiers in the auto-suggestion drop-down list 406 of FIG. 4). In some example implementations, the binding references 510 may be implemented using an extensible markup language (XML) format as shown in FIG. 5 by reference numeral 516 or any other suitable format. Referring briefly to FIG. 7, an example class diagram 700 shows how the binding reference 510 can be represented using a display definition class 702. In the illustrated example of FIG. 7, the display definition class 702 can define a shape element 704 corresponding to one or more shapes used to form the pump graphic 202*b* (FIGS. 2 and 5), property usage descriptions 706 used to describe the different properties of the shape element 704, and a binding reference 708 used to store specified binding information such as, for example, the type of information shown in the binding references 516 of FIG. 5.

In the illustrated example, the binding reference data records 510 include an FIC 101 binding reference 512 used to bind the control module 120 of FIG. 1 corresponding to the FIC101 control module information 504 to the pump graphic 202*b* corresponding to the graphic configuration data record 508. When the identifier value (i.e., the FIC101 identifier) corresponding to the MODULE property 404 (FIG. 4) is changed (e.g., renamed) outside of the graphic editor 514 to a different value (e.g., LI444), the binding reference 512 stores the new identifier (e.g., the LI444 identifier) so that the pump graphic 202*b* can automatically remain bound to the correct control module based on the updated control module identifier value corresponding to the MODULE property 404. In this manner, renaming the control module identifier value in a binding reference (e.g., the binding reference 512) will maintain the validity of the binding reference to maintain a valid binding between a device or equipment graphic and the control module configured to be associated with that device or equipment graphic.

In the illustrated example of FIG. 6, a user uses the explorer user interface 506 to rename the control module identifier value from the FIC101 identifier to LI444 to rename the control module 120 to LI444. In response to this change via the explorer user interface 506, the control module identifier is changed in the control module data record 504 to LI444, and the binding reference 512 is used to find the graphic configuration data record 508 having the control module identifier value FIC101 to change the identifier value from FIC101 to LI444. When a user views the configuration information corresponding to the pump graphic 202*b* (FIG. 2) using the graphic editor user interface 514, the updated control module identifier value will be shown as LI444 as specified in the graphic configuration data record 508.

Figure 8:
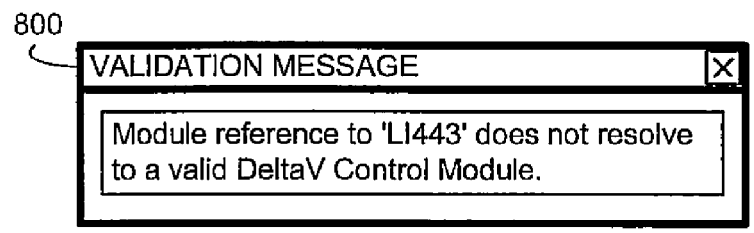
FIG. 8 depicts an example validation message that can be used to present a message regarding the validity of a selected control module identifier for binding a control module with a graphic element.

FIG. 8 depicts an example validation message 800 that can be used to present a message regarding the validity of a selected control module identifier for binding with a device or equipment graphic element (e.g., the pump graphic 202*b* of FIG. 2). In the illustrated example, the validation message 800 indicates that a user-provided control module identifier LI443 does not exist or is invalid for a respective binding type (i.e., a DeltaV Control Module binding type). An example validation process that may be used to verify whether a user-provided control module identifier is valid based on a specified binding type involves comparing the user-provided identifiers with available identifiers associated with a binding type that was previously specified by a user via, for example, the binding type field 306. If a control module identifier associated with the specified binding type does not exist, a validation message such as the validation message 800 can be presented to a user. Additionally or alternatively, the example methods and apparatus described herein can present other indicators (e.g., emit an audible alarm, underline text, highlight text, strikethrough text, and/or perform any other text-related modification of control module identifiers) to indicate that control module identifiers are not valid. In addition, the example methods and apparatus can be configured to run reports across several graphics (e.g., the graphic configuration 201 of FIG. 2) to determine whether any control module identifiers are not valid and present the results in a report format for a user to analyze.

In some example implementations, validation processes can be performed when a user requests to view configuration information for a particular graphic (e.g., one of the graphics 202*a-c* of FIG. 2 via, for example, the graphic editor user interface 514 of FIG. 5. In this manner, if a binding is invalid, a validation message can be presented to a user prior to or without displaying the requested graphic. In some example implementations, validation processes may be performed when a user is working within the properties user interface 400 (FIG. 4) or the graphic studio user interface 514. For example, if a user attempts to provide a control module identifier for a device or equipment graphic (e.g., one of the graphics 202*a-c* of FIG. 2) to resolve an aliased path, a validation process can be used to determine if the path for the provided control module identifier exists. In some example implementations, a user may leave an incorrect or invalid binding and subsequently create a control module identifier having a binding type corresponding to the incorrect or invalid binding. In this manner, after the user creates the control module identifier with the correct binding type, the previously incorrect or invalid binding will resolve so that subsequent validation processes will determine that the previously incorrect or invalid binding is valid.

Figure 9:
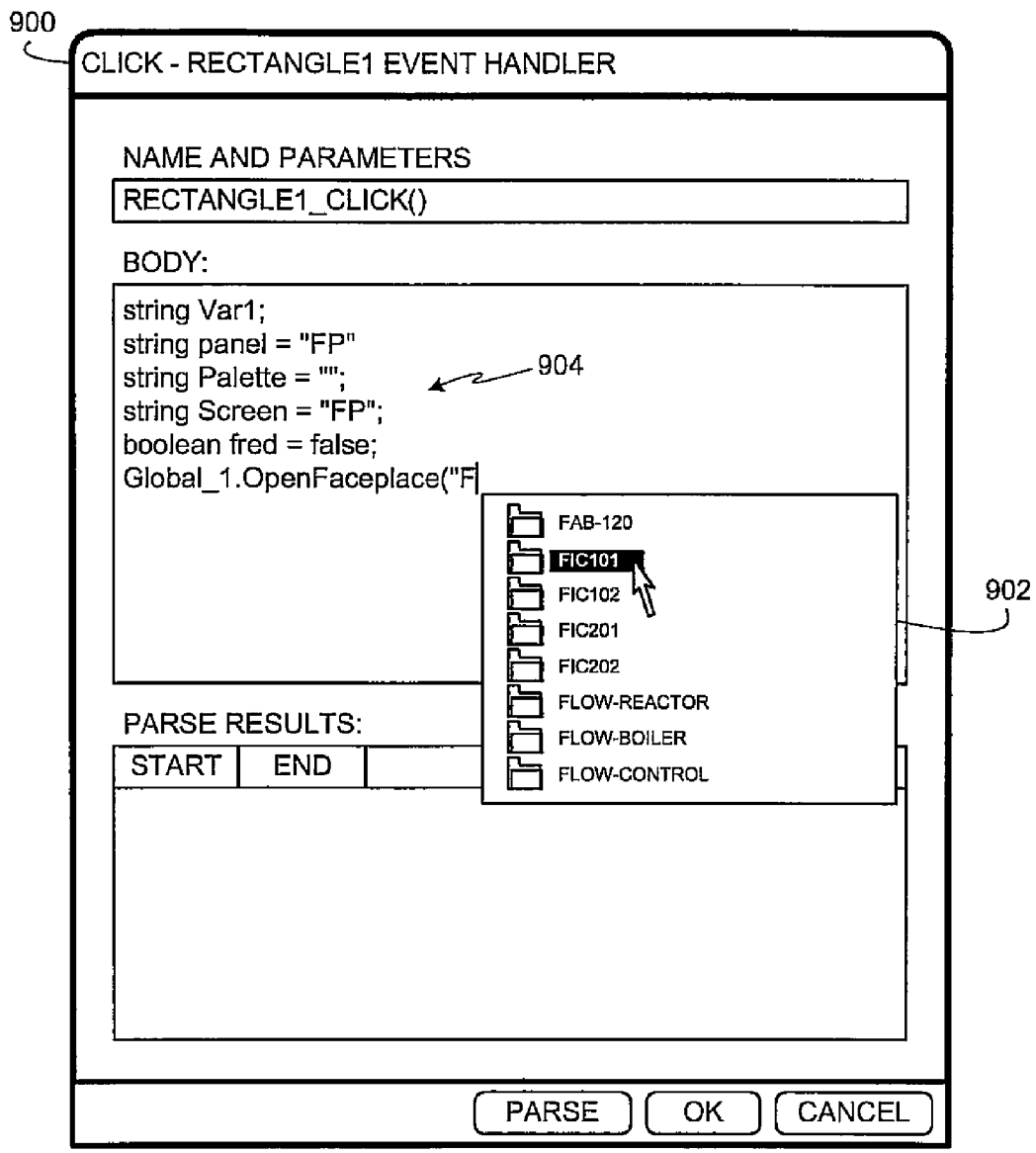
FIG. 9 depicts an example event handler user interface in which the example methods and apparatus described herein can be used to select control module identifier values.

FIG. 9 depicts an example event handler user interface 900 in which the example methods and apparatus described herein can be used to select control module identifier values. The example event handler user interface 900 shows how the binding types described above for binding control modules to device or equipment graphics can be used with parameters based on a global method to provide binding hints (e.g., auto-suggestion listings of control module identifier values based on binding types) in other types of user interfaces. For example, a method parameter definition could have a defined binding type so that when a user calls the corresponding method, a list of valid control module identifier choices could be suggested based on the defined binding type. In the illustrated example of FIG. 9, an example binding hint list 902 provides suggestions of control module identifiers filtered based on a binding type defined for the global method 'Global_1.' The rename tracking and validation processes described above in connection with FIGS. 5-7 can also be used in connection with binding property values to global methods.

In some example implementations, the example methods and apparatus described herein can be used to enable users to provide in-line script language in a script body (e.g., a script body 904 of FIG. 9) to bind different control modules to device or equipment graphics. For example, in an XML tag script line '<DV MODULE>"FIC101"</DV MODULE>,' the XML tag script line defines the binding name 'FIC101' for the binding type named 'DV MODULE.'

Figure 10:
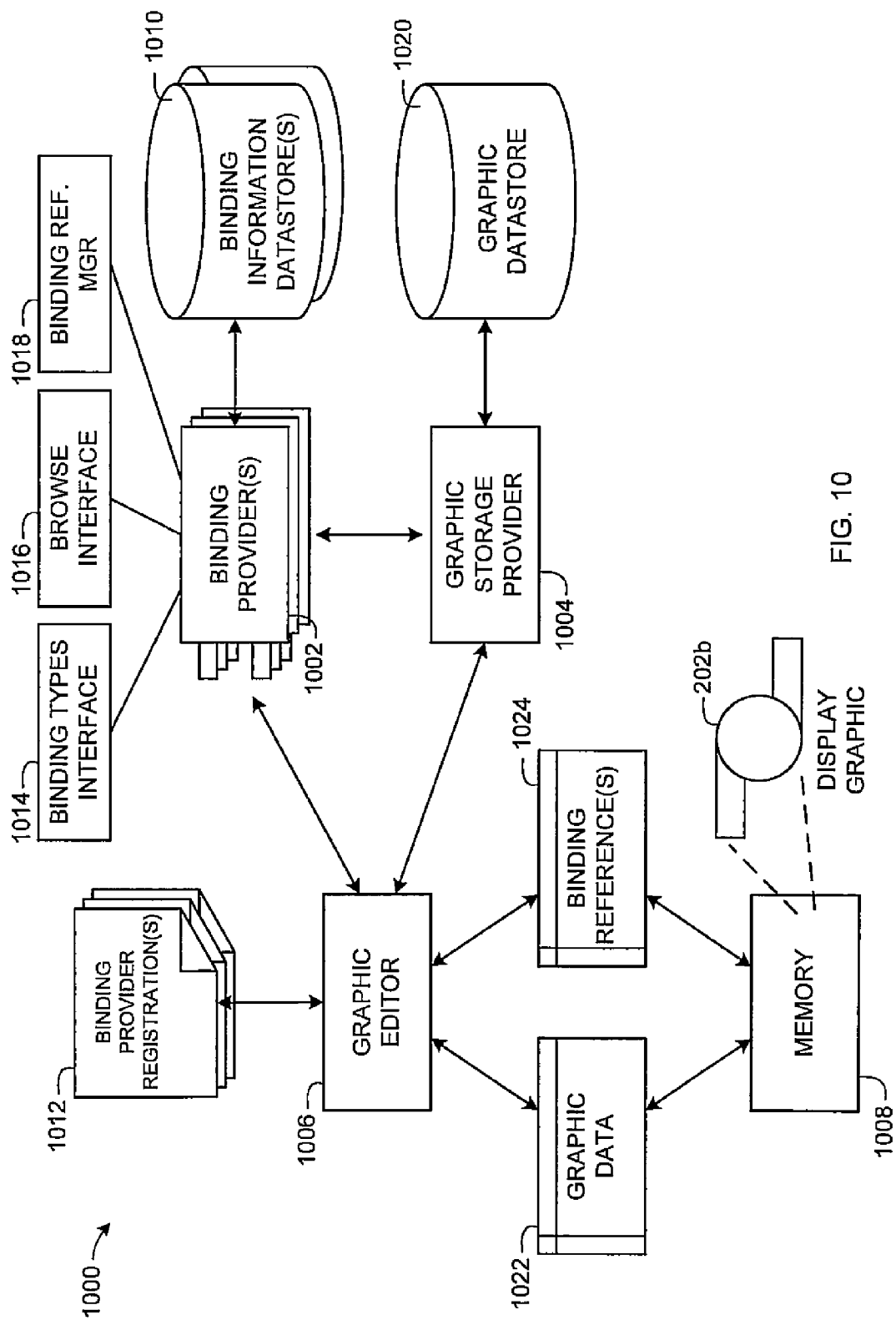
FIG. 10 is a block diagram of an example apparatus that may be used to bind process control modules to graphic elements as described herein.

FIG. 10 is a block diagram of an example apparatus 1000 that may be used to bind process control modules, provide binding hints, and propagate changes to control module identifier values to different graphic elements bound to those control module identifier values. The example apparatus 1000 includes one or more binding provider(s) 1002, a graphic storage provider 1004, a graphic editor 1006, and a memory 1008, all of which may be communicatively coupled as shown or in any other suitable manner. The example apparatus 1000 may be implemented using any desired combination of hardware, firmware, and/or software. For example, one or more integrated circuits, discrete semiconductor components, or passive electronic components may be used. Additionally or alternatively, some or all of the blocks of the example apparatus 1000, or parts thereof, may be implemented using instructions, code, and/or other software and/or firmware, etc. stored on a machine accessible medium that, when executed by, for example, a processor system (e.g., the processor system 2010 of FIG. 20) perform the operations represented in the flow diagrams of FIGS. 16-19. Although the example apparatus 1000 is described as having one of each block described below, the example apparatus 1000 may be provided with two or more of any block described below. In addition, some blocks may be disabled, omitted, or combined with other blocks.

In the illustrated example, the binding provider(s) 1002 are communicatively coupled to one or more binding information datastore(s) 1010 (e.g., one or more binding information databases), which are configured to store binding references (e.g., the binding references 510 of FIGS. 5 and 6) and control module information (e.g., the control module data record 504 of FIGS. 5 and 6). Each of the binding provider(s) 1002 may be registered for use as a binding service available to user interfaces (e.g., the user interfaces of FIGS. 3, 4, 5, 6, and 8) by registering properties in a respective binding provider registration file 1012. Each of the binding provider registration files 1012 includes information to identify its respective binding provider 1002 and the binder provider assemblies and classes that implement interfaces (e.g., a binding types interface 1014, a browse interface 1016, and a binding reference manager 1018) of the binding provider 1002. The binding provider registration files 1012 may be stored in a directory of the graphic editor 1006 (e.g., "<disk>:/<path>/Graphic Editor/Binds") using an extensible markup language (XML) format or any other suitable format.

In the illustrated example, each of the binding provider(s) 1002 corresponds to a different binding type (e.g., binding types specified in the binding type field 306 of FIG. 3). The binding provider registration 1012 may include one or more of a binding provider ID, a binding provider name (e.g., 'DeltaV'), a description, a dynamic link library (DLL) file or .net assembly file for any interfaces implemented by the binding provider 1002, and a class name for each interface of the binding provider 1002. In the illustrated example of FIG. 10, the binding provider 1002 is registered with the graphic editor 1006 by providing it with the binding provider registration 1012.

The binding provider 1002 can access the binding information datastore 1010 to retrieve and store binding type ID's and binding type names. A binding type ID is an internal ID, which may not be displayed to a user, but is used to reference binding types (e.g., the binding types of the binding type field 306 of FIG. 3) within the binding information datastore 1010. A binding type name, which is displayed to a user for selection, may be one of the binding type names available for entry in, for example, the binding type field 306. The binding type name may be associated with a binding type ID or may be localized to a string representing a user's current locale (e.g., an instance of a current working environment).

As shown in FIG. 10, the binding provider 1002 may be configured to provide a binding types interface 1014, a browse interface 1016, and a binding reference manager

1018. The binding types interface 1014 is configured to retrieve binding types (e.g., the binding types of the binding type field 306 of FIG. 3) from the binding information datastore 1010. In the illustrated example, to retrieve the binding types, the binding types interface 1014 implements a 'GetBindingTypes' method that can be used to provide a list of item types (e.g., control module types) that can be associated with device or equipment graphics (e.g., the graphics 202*a*-*c* of FIG. 2) via, for example, the example property definition UI 300. For example, the 'GetBindingTypes' can be used to retrieve the binding types displayed in connection with the binding type field 306 of FIG. 3.

The browse interface 1016 may be an optional interface that can be used if browsing or INTELLISENSE® technology support (i.e., support for generating auto-suggestion listings of items that are progressively filtered based on characters typed by a user) is desired. In the illustrated example, the browse interface 1016 implements a 'GetBindingValues' method that can be used to return a filtered list of values for a binding type specified by a user that match a path or characters already entered by a user in a particular text field. For example, referring to FIG. 4, when a user types in the letter 'F' in the property value field 402, the 'GetBindingValues' method returns a filtered list of control module identifiers that start with the letter 'F' in the auto-suggestion drop-down list 406 that are associated with the selected binding type 'DV Module' 308 in the binding type field 306.

The binding reference manager 1018 may be used to implement rename tracking to propagate changes to control module identifiers (e.g., FIC101, FIC102, etc.) throughout different device or equipment graphics (e.g., the graphics 202*a*-*c* of FIG. 2) as described above in connection with FIGS. 5 and 6. In the illustrated example, the binding reference manager 1018 implements a 'LoadBindingReferences' method and a 'SaveBindingReferences' method. The 'LoadBindingReferences' method may be used to retrieve a string (e.g., a string in an extensible markup language (XML) or any other suitable format) of binding references for a predefined graphic or a user-created graphic. For example, referring to FIGS. 5 and 6, the 'LoadBindingReferences' method can be used to supply the binding reference 512 from the datastore areas 502 to the graphic editor user interface 514 based on the pump graphic 202*b*. The 'SaveBindingReferences' method may be used to store binding reference name changes. For example, referring to FIG. 6, when a user changes the name FIC101 to LI444 in the explorer user interface 506, the 'SaveBindingReference' stores the LI444 name in the binding references 510.

The graphic storage provider 1004 is communicatively coupled to a graphic datastore 1020 (e.g., a graphic database), which is configured to store graphic data 1022. The graphic data 1022 includes device or equipment graphics (e.g., the device or equipment graphics 202*a*-*c* of FIG. 2) and property and/or configuration information for each graphic (e.g., the graphic configuration data record 508 of FIGS. 5 and 6). The graphic storage provider 1004 is configured to retrieve the graphic data 1022 from the graphic datastore 1020 and communicate the retrieved graphic data 1022 to the graphic editor 1006, which loads the graphic data 1022 into the memory 1008 for display to a user. In the illustrated example, when the graphic storage provider 1004 retrieves the graphic data 1022 from the graphic datastore 1020, the binding reference manager 1018 retrieves corresponding binding references 1024 (e.g., ones of the binding references 510 of FIG. 5) from the binding information datastore 1010 and communicates the binding references 1024 to the graphic editor 1006, which loads the binding references 1024 into the memory 1008 for display in association with the graphic data 1022. The graphic editor 1006 may be substantially similar or identical to the graphic editor user interface 514 of FIGS. 5 and 6 and may be used by users to edit properties and configurations of graphics (e.g., the graphic 202*b* of FIGS. 2, 5 and 6) using, for example, user interfaces substantially similar or identical to the user interfaces 300 and 400 of FIGS. 3 and 4.

FIGS. 11-15 are example object-based process diagrams 1100, 1200, 1300, 1400, and 1500 showing the flow of data and/or communications between different object instances used to implement the example methods and apparatus described herein. Each of the object-based process diagrams 1100, 1200, 1300, 1400, and 1500 is described in connection with a respective one of the flow diagrams of FIGS. 16-19. The example process diagrams 1100, 1200, 1300, 1400, and 1500 are described using object instances based on object-oriented programming nomenclature. However, the processes described in the process diagrams 1100, 1200, 1300, 1400, and 1500 and their respective flow diagrams of FIGS. 16-19 may be implemented using types of programming other than object-oriented programming.

FIGS. 16-19 depict flow diagrams that may be used to implement the example methods and apparatus described herein to bind process control modules, provide binding hints, and propagate changes to control module identifier values to different graphic elements bound to those control module identifier values. In some example implementations, the example methods of FIGS. 16-19 may be implemented using machine readable instructions comprising programs for execution by a processor (e.g., the processor 2012 shown in the example processor system 2010 of FIG. 20). The program may be embodied in software stored on a tangible medium such as a CD-ROM, a floppy disk, a hard drive, a digital versatile disk (DVD), or a memory associated with the processor 2012 and/or embodied in firmware and/or dedicated hardware in a well-known manner. Further, although the example programs are described with reference to the flow diagrams illustrated in FIGS. 16-19, persons of ordinary skill in the art will readily appreciate that many other methods of implementing those programs may alternatively be used. For example, the order of execution of blocks or operations may be changed, and/or some of the blocks or operations described may be changed, eliminated, or combined. Although the example methods of FIGS. 16-19 are generally described as processing (e.g., creating, saving, loading, etc.) one graphic element and one binding reference for that graphic element, the example methods of FIGS. 16-19 can be used to process a plurality of graphic elements and a plurality of binding references. For example, if a user creates a process graphics display as shown in FIG. 2, the example methods of FIGS. 16-19 can be used to process all of the graphic data corresponding to the equipment graphic elements 202*a*-*c* and their corresponding plurality of binding references.

Figure 11:
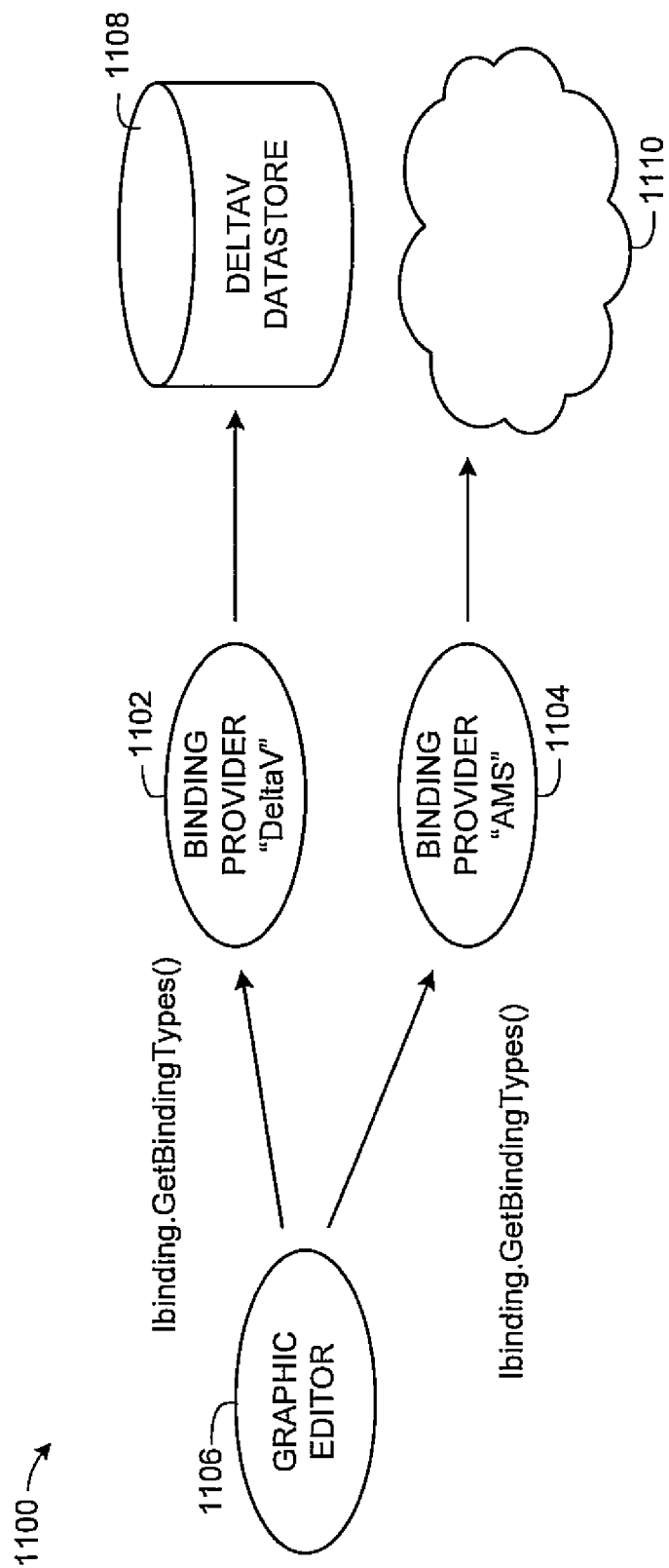
FIG. 11 is an example object-based process diagram showing a flow of data and/or communications between different object instances to retrieve binding types using different binding providers.
Figure 16:
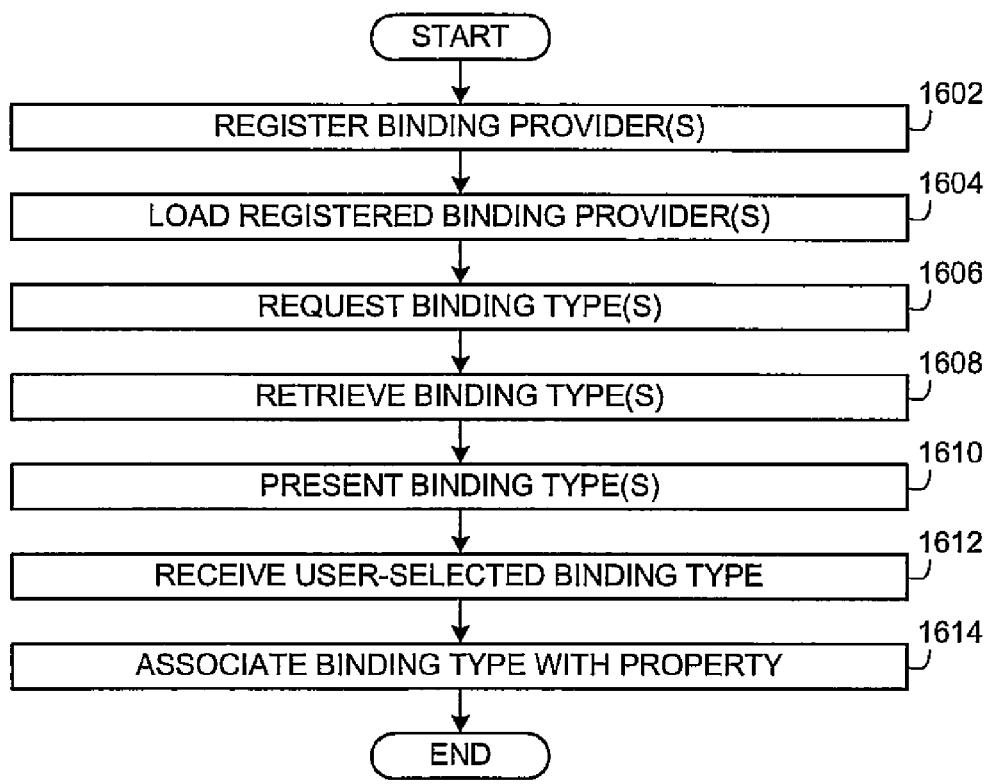
FIG. 16 is a flow diagram of an example method that may be used to retrieve binding types using different binding providers.

Turning to FIG. 16, an example method to retrieve binding types from different binding providers involves initially registering one or more of the binding providers 1002 (FIG. 10) (block 1602). For example, one of the binding providers 1002 can register itself by providing its respective binding provider registration information 1012 (FIG. 10) to the graphic editor 1006. Referring briefly to FIG. 11, when a DeltaV binding provider registers itself, it provides a location of a DeltaV binding provider object 1102 to the graphic editor 1006, and when an Asset Management System (AMS) binding provider registers itself, it provides the location of an AMS binding provider object 1104.

Returning to FIG. 16, the graphic editor 1006 (FIG. 10) then loads the registered binding providers 1002 (block 1604)

in, for example, the local memory 1008. For example, the graphic editor 1006 can load the registered binding providers 1002 by reading the binding provider registration files 1012 to create a display class such as, for example, the display definition class 702 of FIG. 7. The graphic editor 1006 then requests the binding types (block 1606) for each of the loaded registered binding providers 1002. For example, referring to FIG. 11, a graphic editor object 1106, which may be used to implement the graphic editor 1006 of FIG. 10, can communicate a binding type request (Ibinding.GetBindingTypes( )) to the DeltaV binding provider object 1102 to retrieve one or more binding types associated therewith and communicate a binding type request to the AMS binding provider object 1104 to retrieve one or more binding types associated therewith.

Returning to FIG. 16, the registered binding providers 1002 (FIG. 10) then retrieve their respective binding types (block 1608) from respective datastores. For example, referring to FIG. 11, the DeltaV binding provider object 1102 retrieves its binding type (e.g., a 'DeltaV module' binding type) from a DeltaV datastore 1108, which may be implemented using one of the binding information datastores 1010 of FIG. 10. The AMS binding provider 1104 retrieves its binding type via a network 1110 from another storage area (e.g., a remote storage location, a third-party storage location, etc.) (not shown).

Figure 12:
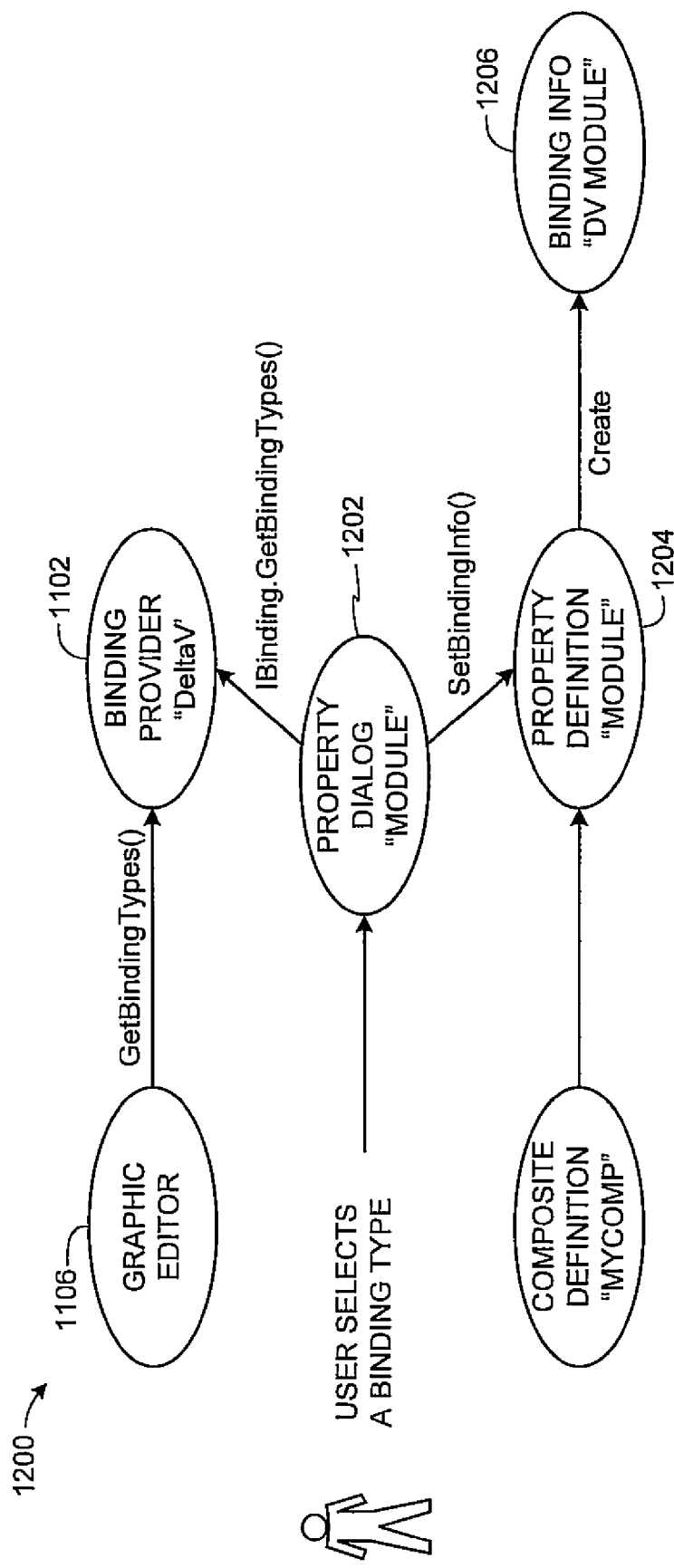
FIG. 12 is an example object-based process diagram showing a flow of data and/or communications between different object instances to assign a binding type to a property of a graphic element.

As shown in FIG. 16, the graphic editor 1006 then presents the retrieved binding type(s) (block 1610). For example, the graphic editor 1006 may display one or more of the binding types displayed in association with the binding type field 306 of FIG. 3. Referring briefly to FIG. 12, to enable the graphic editor 1006 (FIG. 10) to present the binding type(s), a property dialog object 1202 (which may be used to implement the example property definition UI 300 of FIG. 3) for the property named 'MODULE' communicates a request (IBinding.GetBindingTypes( )) to the DeltaV binding provider object 1102 to populate a list of the retrieved binding type(s) (e.g., the list of binding types displayed in association with the binding type field 306 of FIG. 3).

Returning to FIG. 16, the graphic editor 1006 receives a user-selected binding type (block 1612) and associates (or assigns) the binding type with a binding type property (block 1614) of a device or equipment graphic. For example, a user may select one of the binding types via the binding type field 306 of FIG. 3 and associate the selected binding type to, for example, the pump graphic 202*b* of FIGS. 2, 5, 6, and 10. Referring to FIG. 12, to assign the user-selected binding type to a binding type property of the pump graphic 202*b*, a property definition object 1204 for the property named 'MODULE' creates a binding information object 1206 including the selected binding type (e.g., 'DV Module'). The example process of FIG. 16 then ends.

Figure 13:
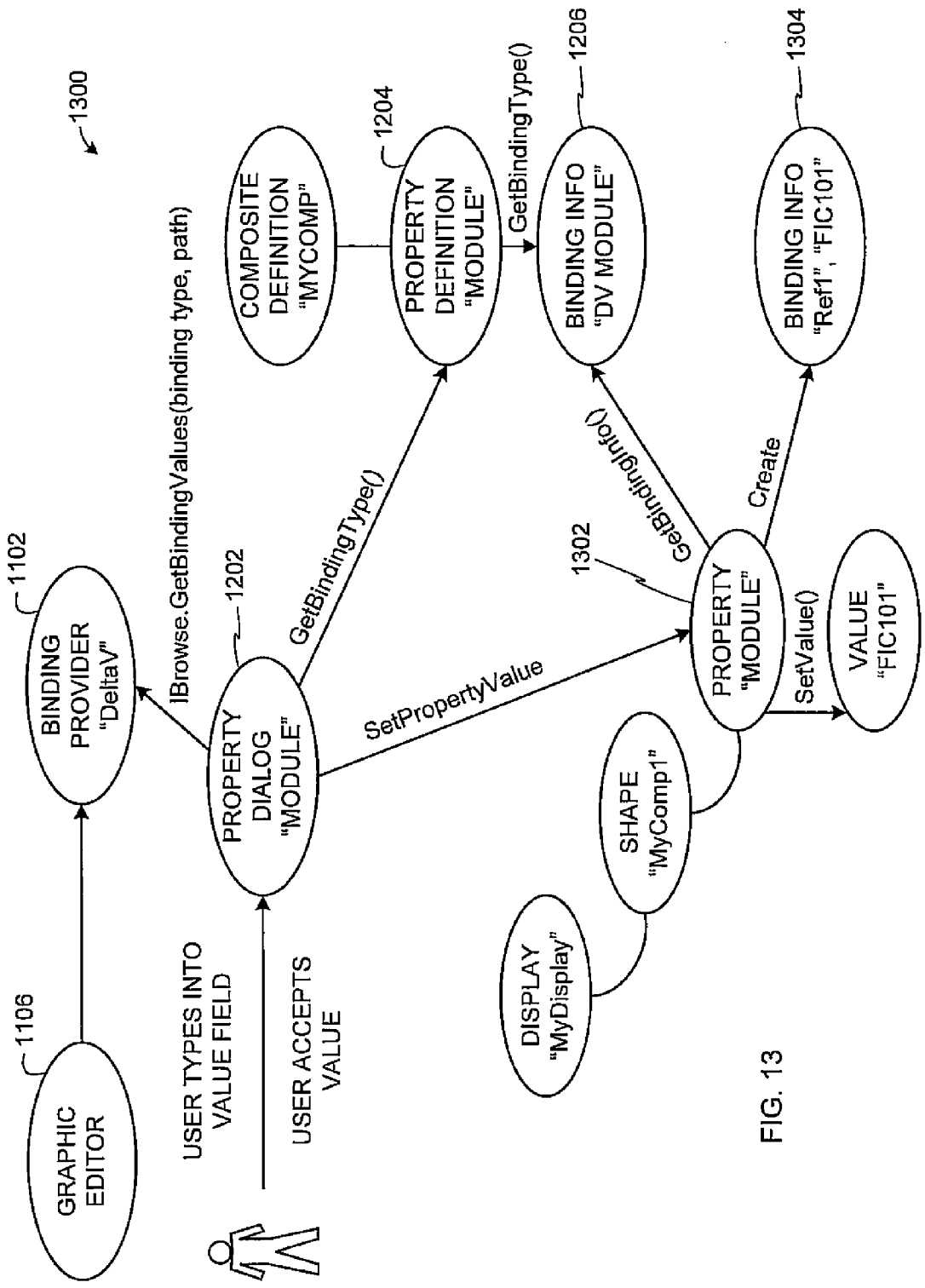
FIG. 13 is an example object-based process diagram showing a flow of data and/or communications between different object instances to create a binding reference.
Figure 14:
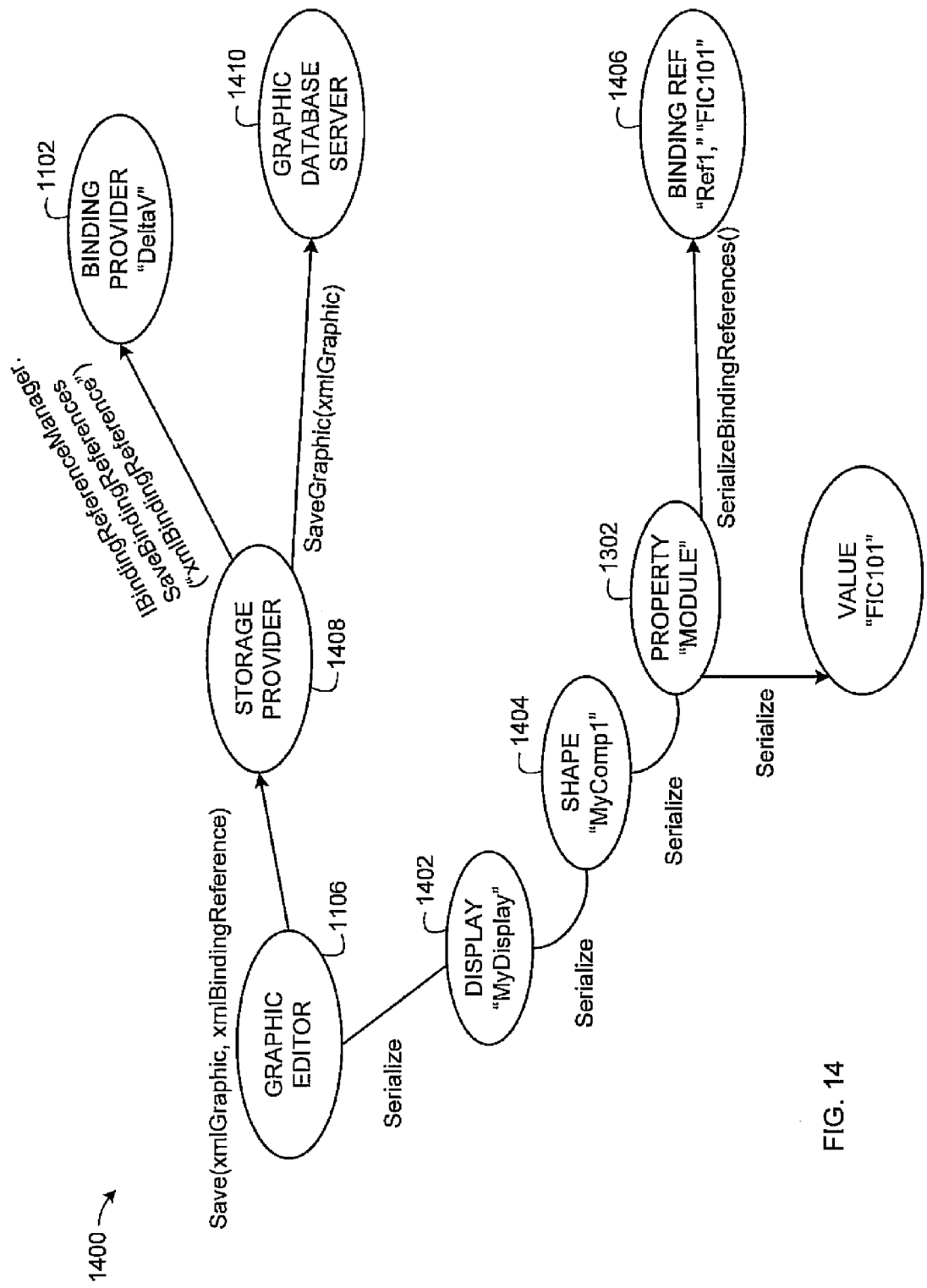
FIG. 14 is another example object-based process diagram showing a flow of data and/or communications between different object instances to save a binding reference.
Figure 17:
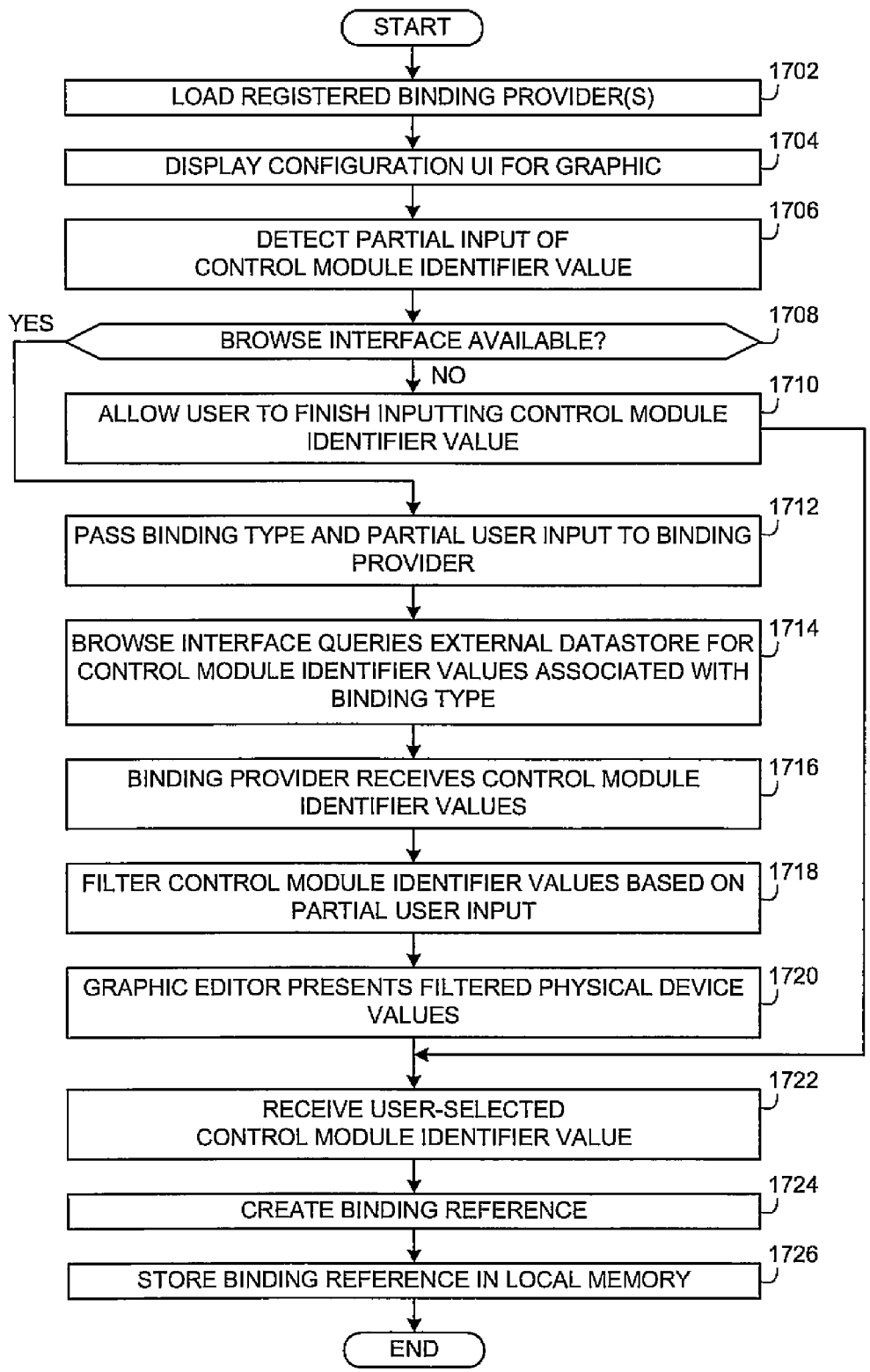
FIG. 17 is a flow diagram of an example method that may be used to associate a control module identifier to a device or equipment graphic element.

Turning now to the flow diagram of FIG. 17, an example process to associate a control module identifier (e.g., FIC101) to a device or equipment graphic element (e.g., the pump graphic 202*b* of FIGS. 2, 5, 6, and 10) involves initially loading one or more registered binding providers (block 1702). For example, the graphic editor 1006 of FIG. 10 can load one or more of the binding providers 1002 as described above in connection with block 1604 of FIG. 16. The graphic editor 1006 then displays a configuration user interface for a device or equipment graphic (block 1704). For example, the graphic editor 1006 can display the graphic properties user interface 400 of FIG. 4 to enable configuration of properties for the pump graphic 202*b* of FIGS. 2, 5, 6, and 10. Referring briefly to FIG. 13, to display the graphic properties user interface 400, the property dialog object 1202 sends a binding type request (GetBindingType( )) to the property definition object 1204 to receive the binding type associated with the pump graphic 202*b*. In turn, the property definition object 1204 retrieves the binding type (e.g., 'DV Module') of the pump graphic 202*b* from the binding information object 1206 and returns the binding type to the property dialog object 1202. Having the binding type associated with the pump graphic 202*b* enables the graphic editor 1006 to subsequently generate an auto-suggestion listing of control module identifiers of that binding type to a user in association with, for example, the property value field 402 of the example properties user interface 400 of FIG. 4.

Referring again to FIG. 17, the graphic editor 1006 then detects a user's partial input of a control module identifier value (block 1706) in, for example, the property value field 402 of the properties user interface 400 of FIG. 4. The partial user input may be a string of characters, numbers, symbols, etc. The graphic editor 1006 then determines whether the browse interface 1016 (FIG. 10) is available (block 1708). For example, if the browse interface 1016 is not an enabled function, the graphic editor 1006 cannot present an auto-suggestion list of available control module identifiers associated with a particular binding type of a graphic. That is, the graphic editor 1006 cannot present the listing of control module identifier values in the auto-suggestion drop-down list 406 as shown in FIG. 4. If the graphic editor 1006 determines that the browse interface 1016 is not available (block 1708), then the graphic editor 1006 allows a user to finish entering the control module identifier (block 1710) in, for example, the property value field 402.

If the graphic editor 1006 determines that the browse interface 1016 is available (block 1708), the graphic editor 1006 passes the binding type (e.g., 'DV Module') associated with the pump graphic 202*b* and the partial user input to one of the binding providers 1002 (block 1712). For example, referring to FIG. 13, the property dialog object 1202 for the property named 'MODULE' communicates the binding type and the partial user input (e.g., a partial path) to the DeltaV binding provider 1102 via a request (IBrowse.GetBindingValues (binding type, path)) to receive control module identifier values associated with that binding type. As shown in FIG. 17, the browse interface 1016 (FIG. 10) then queries one of the datastores 1010 (FIG. 10) to retrieve a listing of control module identifier values associated with the binding type (block 1714). The binding provider 1002 then receives the control module identifier values retrieved from the datastore 1010 (block 1716).

The binding provider 1002 or the graphic editor 1006 filter the received control module identifier values based on the partial user input (block 1718) entered in the property value field 402 (FIG. 4). In this manner, the graphic editor 1006 can present only those control module identifier values matching the user's partial input. For example, as shown in FIG. 4, in response to the user typing the character 'F,' the auto-suggestion drop-down list 406 presents control module identifier values beginning with the character 'F.' The graphic editor 1006 then presents the filtered control module identifier values (block 1720) via, for example, the auto-suggestion drop-down list 406 of FIG. 4. The graphic editor 1006 then receives a user-selected control module identifier value (block 1722) in response to, for example, the user selecting one of the values in the auto-suggestion drop-down list 404 or the user entering the control module identifier value at block 1710. In some example implementations, the example method of FIG. 17 can be modified to include a validation operation in which the graphic editor 1006 performs a validation operation on the user input value provided at block 1710 to ensure that it can be used to create a valid binding reference for a graphic element.

If the user input value is not valid, a warning can be displayed to a user via, for example, the example validation message 800 of FIG. 8.

The graphic editor 1006 then creates a binding reference (e.g., one of the binding references 1024 of FIG. 10) based on the user-selected control module identifier value (block 1724). For example, referring to FIG. 13, the property dialog object 1202 can communicate a set property value request (SetPropertyValue) to a property object 1302 for the property named 'MODULE' including the user-selected control module identifier value, and the property object 1302 may set its value (SetValue( )) to the user-selected control module identifier value (e.g., FIC101). The property object 1302 can then get the binding type of the pump graphic 202b from the binding information object 1206 for the binding type named 'DV MODULE' using a GetBindingInfo( ) request and create a binding reference object 1304 based on the binding type (e.g., 'DV Module') and the user-selected control module identifier value (e.g., FIC101). Returning to FIG. 17, the graphic editor 1006 stores the binding reference object 1304 in the local memory 1008 (FIG. 10) (block 1726). The example method of FIG. 17 then ends.

Figure 18:
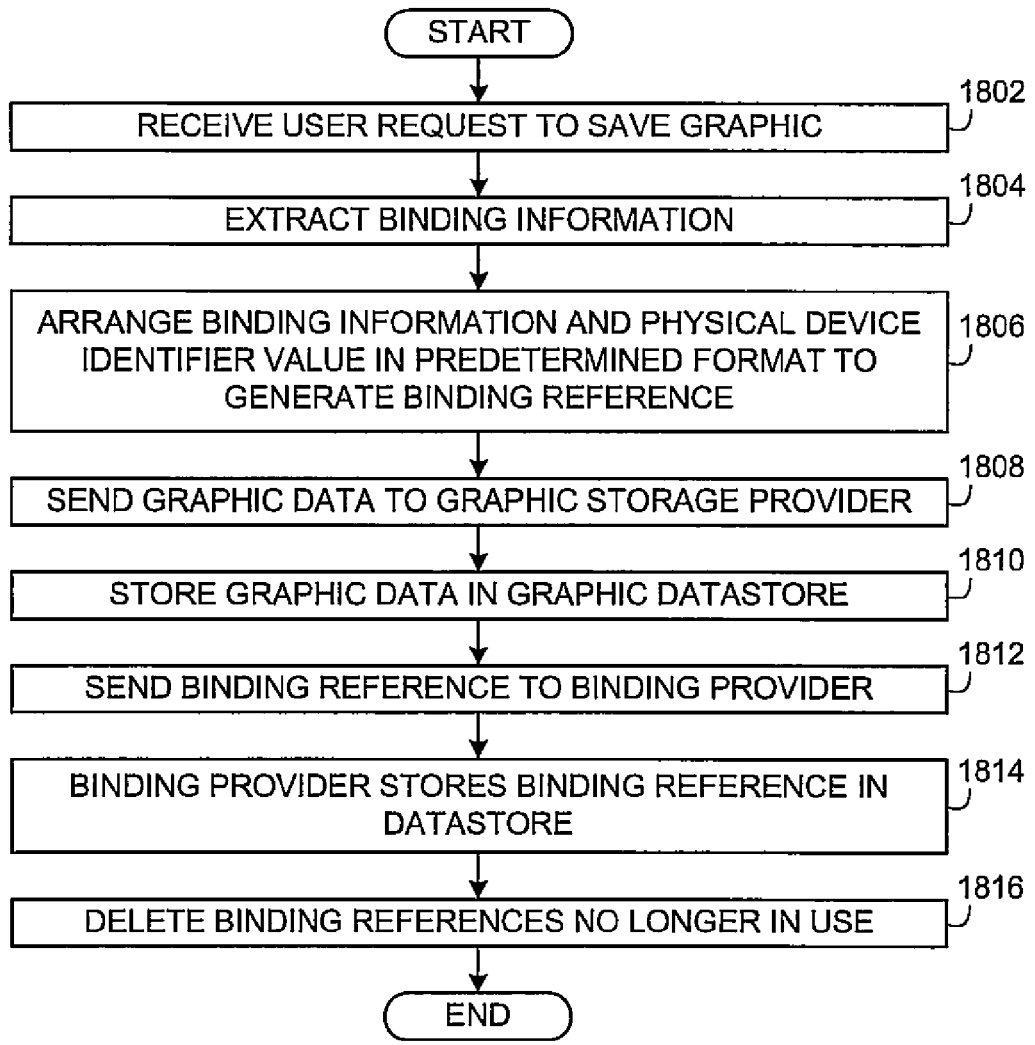
FIG. 18 is a flow diagram of an example method that may be used to store a binding reference.

Turning to FIG. 18, an example method that may be used to store a binding reference (e.g., one of the binding references 1024 of FIG. 10) involves initially receiving a user request to save a graphic element (block 1802). For example, a user may select an option to save the pump graphic 202b of FIGS. 2, 5, 6, and 10. The graphic editor 1006 extracts binding information associated with the pump graphic 202b from the local memory 1008 (FIG. 10) (block 1804) and arranges the binding information and the associated control module identifier value in a predetermined format to generate a binding reference (e.g., the binding reference 1024 of FIG. 10) (block 1806). The predetermined format can be one that can be used outside of the graphic editor 1006 such as, for example, the XML format of the binding references indicated by reference numeral 516 of FIG. 5. For example, referring to FIG. 14, the graphic editor object 1106 can format (e.g., serialize) the binding information (e.g., the binding provider name, the binding type, and the control module identifier value) via a display object 1402, a shape object 1404, the property object 1302 to form a binding reference object 1406.

The graphic editor 1006 sends the graphic data 1022 for the pump graphic 202b to the graphic storage provider 1004 (block 1808), and the graphic storage provider 1004 stores the graphic data 1022 in the graphic datastore 1020 (FIG. 10) (block 1810). The graphic editor 1006 then sends the binding reference 1024 to the binding provider 1002 (FIG. 10) (block 1812), and the binding provider 1002 stores the binding reference 1024 in one of the datastores 1010 (block 1814). For example, referring to FIG. 14, the graphic editor object 1106 can use a storage provider object 1408 to store the graphic data 1022 and the binding reference 1024 by communicating a save request to the storage provider object 1408 (Save (xmlGraphic, xmlBindingReferences)). The storage provider object 1408 can then communicate the binding reference 1024 to the DeltaV binding provider 1102 (IBindingReferenceManager.SaveBindingReferences("xmlBindingReference")) to enable the binding provider 1002 (FIG. 10) to store the binding reference 1024 in the datastore 1010 (FIG. 10). In addition, the storage provider object 1408 can communicate the graphic data 1022 to a graphic database server object 1410, which may be used to implement the graphic storage provider 1004 of FIG. 10. In this manner, the graphic storage provider 1004 can store the graphic data 1022 in the graphic datastore 1020.

Returning to FIG. 18, the binding provider 1002 then deletes any binding reference in the datastore 1010 that are no longer in use (block 1816). For example, referring to FIG. 6, when the binding reference FIC101 is changed to LI444, the binding reference(s) labeled FIC101 in the datastore 1010 are deleted. That is, after the binding reference identifier FIC101 is changed to LI444, the LI444 binding reference is used to bind the pump graphic 202b to a particular control module (e.g., the pump control module 120 of FIG. 1). Otherwise, duplicative binding references could cause problems (e.g., system contention). The example method of FIG. 18 is then ended.

Figure 19:
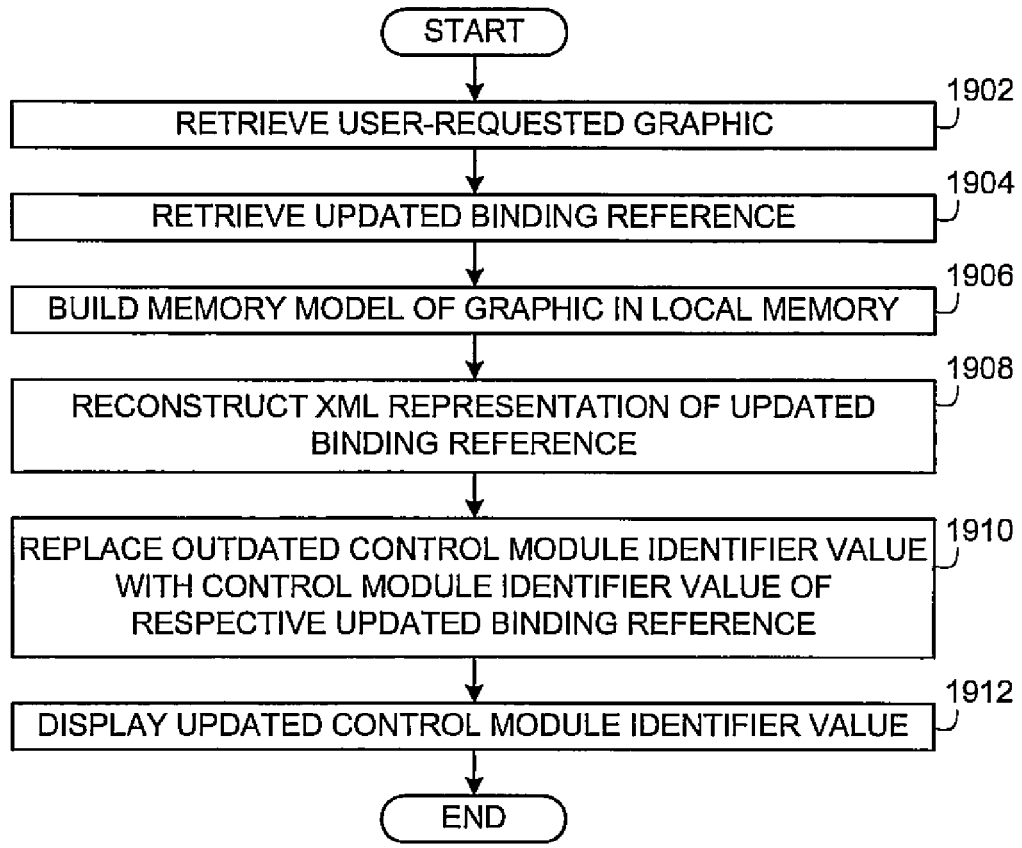
FIG. 19 is a flow diagram of an example method that may be used to load a graphic element using updated binding reference information.

Turning to FIG. 19, the illustrated flow diagram depicts an example method that may be used to load a device or equipment graphic element (e.g., the pump graphic 202b of FIGS. 2, 5, 6, and 10) using the most recent binding reference information. The example method of FIG. 19 may also be used to propagate changes to control module identifier values (e.g., changing FIC101 to LI444 as described above) in binding references to corresponding device or equipment graphics when those graphics are loaded by the graphic editor 1006. For example, if a user changes the control module identifier value of the binding reference 1024 (FIG. 10) outside of the graphic editor 1006 (e.g., in the explorer user interface 506 of FIG. 5) after the binding reference 1024 is stored in one of the datastores 1010, the graphic editor 1006 will have no record of this change. However, using the example method of FIG. 19, the new control module identifier value of the binding reference 1024 can be updated for a corresponding graphic (e.g., the pump graphic 202b) when the graphic editor 1006 loads the graphic.

As shown in FIG. 19, initially the graphic editor 1006 retrieves a user-requested graphic (block 1902). For example, the graphic editor 1006 may retrieve the pump graphic 202b in response to a user-request to load that graphic or to load a display including that graphic. The binding provider 1002 corresponding to the pump graphic 202b retrieves the updated binding reference for the pump graphic 202b (block 1904) from one of the datastores 1010 (FIG. 10). The updated binding reference can be a binding reference having the most recent information including any changes made by users to the binding reference outside of the graphic editor 1006.

Figure 15:
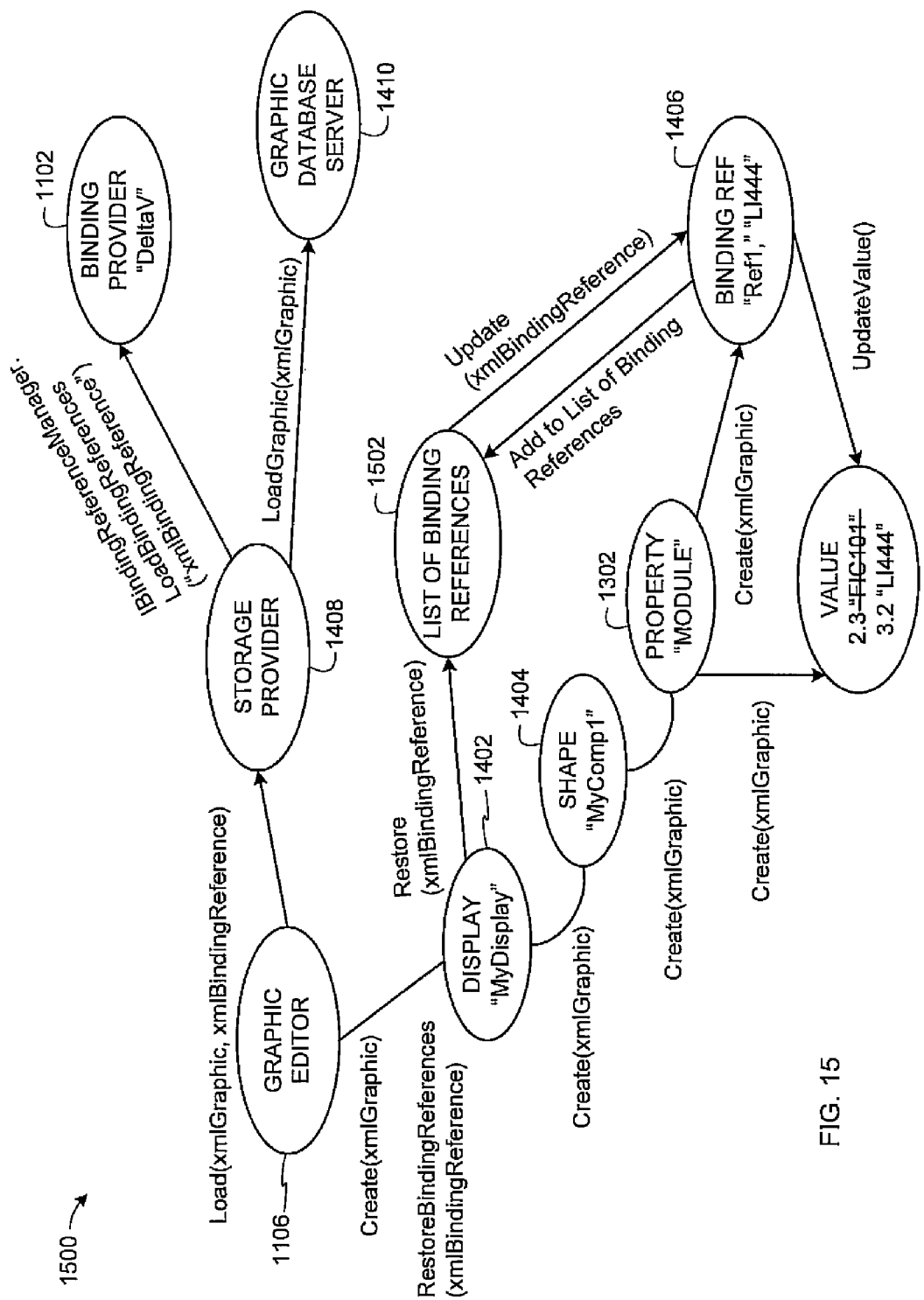
FIG. 15 is another example object-based process diagram showing a flow of data and/or communications between different object instances to load a graphic element using updated binding reference information.

An example manner in which the graphic editor 1006 may retrieve the graphic data 1022 in connection with block 1902 and the binding provider 1002 may retrieve the updated binding reference at block 1904 is shown in FIG. 15. For example, referring to FIG. 15, the graphic editor object 1106 may communicate a load request (Load(xmlGraphic, xmlBindingReferences)) to the storage provider object 1408 based on graphic and binding reference identifier information in the local memory 1008 corresponding to the user-requested graphic. The storage provider object 1408 can communicate a binding references request (IBindingReferenceManager.LoadBindingReferences("xmlBindingReference")) to the DeltaV binding provider object 1102 and communicate a graphic data request (LoadGraphic(xmlGraphic)) to the graphic database server object 1410. In this manner, the binding provider 1002 can retrieve the updated binding reference from the datastore 1010, and the graphic storage provider 1004 can retrieve the graphic data 1022 from the graphic datastore 1020.

Returning to FIG. 19, the graphic editor 1006 builds a memory model of the pump graphic 202b in the local memory 1008 (block 1906). For example, as shown in FIG. 15, the graphic editor object 1106 can communicate a request to create the graphic memory model including the retrieved graphic data 1022 (Create(xmlGraphic)) to the display object 1402, the shape object 1404, the property object 1302, and the binding reference object 1406. The graphic editor object 1106 builds the graphic memory model based on values stored in the local memory 1008 by the graphic editor 1006 during a previous session in which a user selected to work with the same graphic. Therefore, some of the values may be different from values in the updated binding reference retrieved at block 1904. To indicate that the potentially outdated binding reference is loaded for the graphic memory model, the binding reference object 1406 adds a binding reference identifier (e.g., 'Ref1') for the loaded binding reference to a list of binding references object 1502.

As shown in FIG. 19, the binding provider 1002 then reconstructs an XML representation of the updated binding reference (block 1908). For example, as shown in FIG. 15, the graphic editor object 1106 can communicate a restore request (RestoreBindingReferences(xmlBindingReference)) including the updated binding reference information retrieved at block 1904 to the display object 1402. As shown in FIG. 19, the graphic editor 1006 then replaces an outdated control module identifier value in the memory model of the local memory 1008 with a corresponding updated control module identifier value in the updated binding reference (block 1910). For example, referring to FIG. 15, the display object 1402 can communicate a restore request (Restore(xmlBindingReference)) to the list of binding references object 1502, and the list of binding references object 1502 can communicate an update request (Update(xmlBindingReference)) to the binding reference object 1406. In this manner, the binding reference object 1406 can retrieve the updated control module identifier value (LI444) from the binding provider 1002 based on the binding reference identifier (e.g., 'Ref1') and store the updated control module identifier value (LI444) by replacing the previous, outdated control module identifier value (FIC101) with the updated control module identifier value (LI444) to associate the updated control module identifier value (LI444) with the pump graphic 202b and, thus, disassociate the outdated control module identifier value (FIC101) from the pump graphic 202b. In some example implementations, the list of binding references object 1502 only communicates the update request to the binding reference object 1406 if the control module identifier value in the updated binding reference information retrieved at block 1904 is different from the control module identifier value in the graphic memory model loaded in the local memory 1008 at block 1906. The graphic editor 1006 then displays the updated control module identifier value (block 1912). The example method of FIG. 19 then ends.

Figure 20:
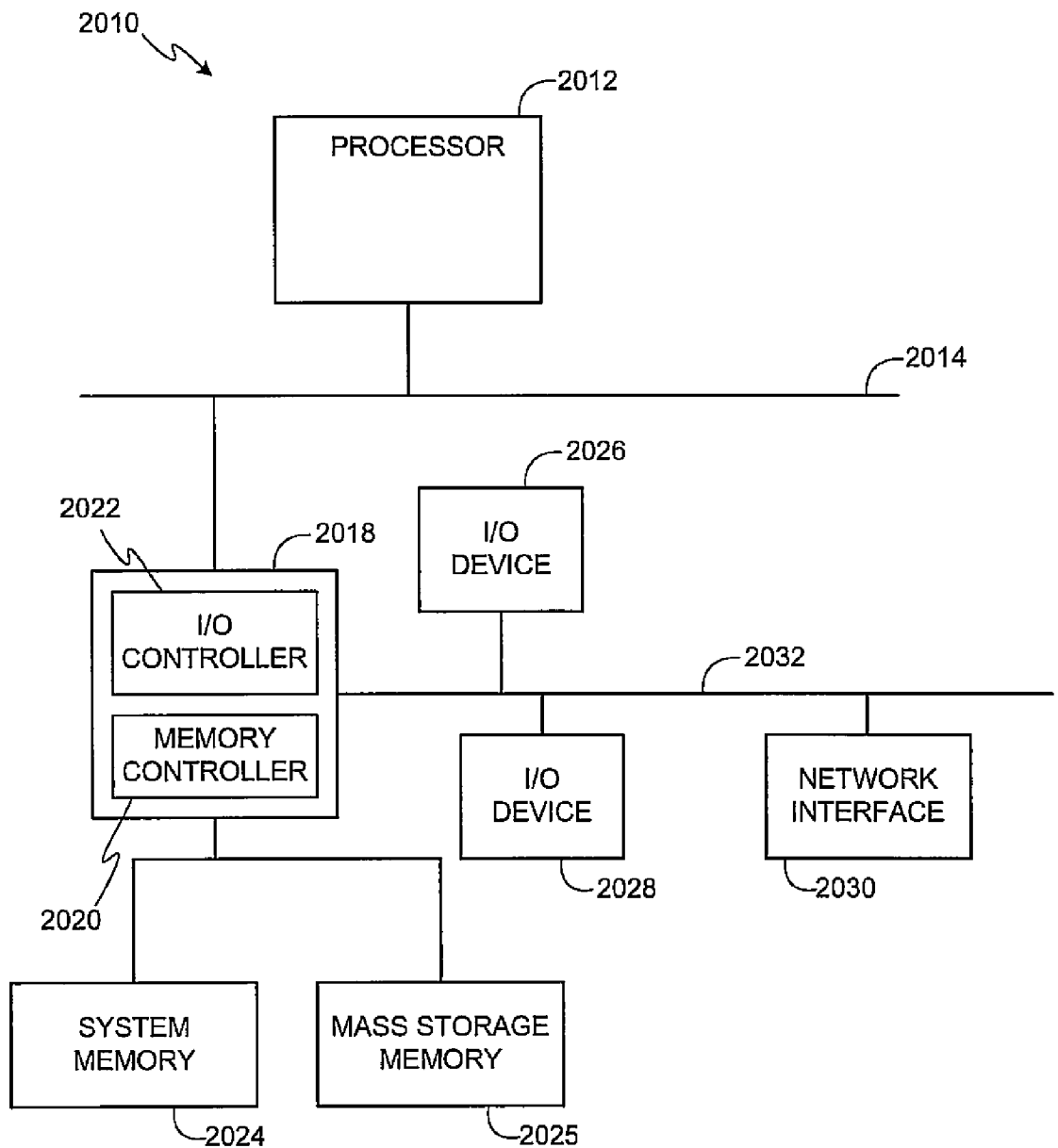
FIG. 20 is a block diagram of an example processor system that may be used to implement the example methods and apparatus described herein.

FIG. 20 is a block diagram of an example processor system 2010 that may be used to implement the apparatus and methods described herein. As shown in FIG. 20, the processor system 2010 includes a processor 2012 that is coupled to an interconnection bus 2014. The processor 2012 includes a register set or register space 2016, which is depicted in FIG. 20 as being entirely on-chip, but which could alternatively be located entirely or partially off-chip and directly coupled to the processor 2012 via dedicated electrical connections and/or via the interconnection bus 2014. The processor 2012 may be any suitable processor, processing unit or microprocessor. Although not shown in FIG. 20, the system 2010 may be a multi-processor system and, thus, may include one or more additional processors that are identical or similar to the processor 2012 and that are communicatively coupled to the interconnection bus 2014.

The processor 2012 of FIG. 20 is coupled to a chipset 2018, which includes a memory controller 2020 and a peripheral input/output (I/O) controller 2022. As is well known, a chipset typically provides I/O and memory management functions as well as a plurality of general purpose and/or special purpose registers, timers, etc. that are accessible or used by one or more processors coupled to the chipset 2018. The memory controller 2020 performs functions that enable the processor 2012 (or processors if there are multiple processors) to access a system memory 2024 and a mass storage memory 2025.

The system memory 2024 may include any desired type of volatile and/or non-volatile memory such as, for example, static random access memory (SRAM), dynamic random access memory (DRAM), flash memory, read-only memory (ROM), etc. The mass storage memory 2025 may include any desired type of mass storage device including hard disk drives, optical drives, tape storage devices, etc.

The peripheral I/O controller 2022 performs functions that enable the processor 2012 to communicate with peripheral input/output (I/O) devices 2026 and 2028 and a network interface 2030 via a peripheral I/O bus 2032. The I/O devices 2026 and 2028 may be any desired type of I/O device such as, for example, a keyboard, a video display or monitor, a mouse, etc. The network interface 2030 may be, for example, an Ethernet device, an asynchronous transfer mode (ATM) device, an 802.11 device, a DSL modem, a cable modem, a cellular modem, etc. that enables the processor system 2010 to communicate with another processor system.

While the memory controller 2020 and the I/O controller 2022 are depicted in FIG. 20 as separate functional blocks within the chipset 2018, the functions performed by these blocks may be integrated within a single semiconductor circuit or may be implemented using two or more separate integrated circuits.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method in a workstation to bind a configuration element to a physical device of a distributed-equipment process control system using a property of the configuration element, the method comprising:
   associating a first binding type selected for the physical device by a user from a plurality of binding types with the property of the configuration element, the configuration element being representative of the physical device of the distributed-equipment process control system, the physical device being separate from the workstation;
   excluding first control module identifiers from being user-selectable to control the physical device based on a selection of the first binding type;
   during user configuration of the configuration element, filtering out the excluded first control module identifiers and presenting second control module identifiers corresponding to the first binding type, each of the second control module identifiers being user-selectable via the presentation, and each of the second control module identifiers identifying a respective process useable to control the physical device in the distributed-equipment process control system;
   identifying a selection of a first one of the presented second control module identifiers; and
   generating a binding reference to bind the configuration element to a process corresponding to the first one of the second control module identifiers, the binding reference to cause the process to control the physical device.

2. A method as defined in claim 1, wherein the second control module identifiers are presented based on at least a portion of each of the second control module identifiers matching a partial user input.

3. A method as defined in claim 2, wherein the partial user input includes at least one of a character string, a number, or a symbol.

4. A method as defined in claim 1, further comprising presenting the second control module identifiers using an auto-suggestion list displaying the second control module identifiers.

5. A method as defined in claim 1, further comprising validating that the first one of the second control module identifiers can be used to generate a valid binding reference.

6. A method as defined in claim 1, further comprising displaying an indicator to indicate that the first one of the second control module identifiers is not a valid binding reference.

7. A method as defined in claim 1, further comprising storing the first one of the second control module identifiers in a local memory of an editor, loading an updated binding reference for the property of the configuration element, and replacing the first one of the second control module identifiers in the local memory of the editor with an updated control module identifier from the updated binding reference.

8. A method as defined in claim 1, wherein the configuration element is a graphic element.

9. A method as defined in claim 1, wherein the process corresponding to the first one of the second control module identifiers is to execute in a controller to control the physical device in the distributed-equipment process control system, the controller being separate from the workstation and the physical device.

10. An apparatus to bind a configuration element to a physical device of a distributed-equipment process control system using a property of the configuration element, the apparatus comprising:
 a binding provider to retrieve a plurality of control module identifiers for the property of the configuration element representative of the physical device of the distributed-equipment process control system, the physical device to be separate from the apparatus, wherein the binding provider retrieves the plurality of control module identifiers based on a first binding type selected for the physical device by a user from a plurality of binding types associated with the property, wherein a selection of the first binding type is to exclude first control module identifiers from being user-selectable to control the physical device; and
 an element editor to, via a processor:
  during user configuration of the configuration element, filter out the excluded first control module identifiers, and present second control module identifiers corresponding to the first binding type, each of the second control module identifiers being user-selectable via the presentation, and each of the second control module identifiers identifying a respective process useable to control the physical device in the distributed-equipment process control system;
  identify a selection of a first one of the presented second control module identifiers; and
  generate a binding reference to bind the configuration element to a process corresponding to the first one of the second control module identifiers, the binding reference to cause the process to control the physical device.

11. An apparatus as defined in claim 10, wherein the element editor is to present the second control module identifiers based on at least a portion of each of the second control module identifiers matching a partial user input.

12. An apparatus as defined in claim 11, wherein the partial user input includes at least one of a character string, a number, or a symbol.

13. An apparatus as defined in claim 10, wherein the element editor is to present the second control module identifiers using an auto-suggestion list displaying the second control module identifiers.

14. An apparatus as defined in claim 10, wherein the element editor is to validate that the first one of the second control module identifiers can be used to generate a valid binding reference.

15. An apparatus as defined in claim 10, wherein the element editor is to display an indicator to indicate that the first one of the second control module identifiers is not a valid binding reference.

16. An apparatus as defined in claim 10, wherein the element editor is further to record the first one of the second control module identifiers in a local memory associated with the element editor, load an updated binding reference for the property of the configuration element, and replace the first one of the second control module identifiers in the local memory with an updated control module identifier from the updated binding reference.

17. An apparatus as defined in claim 10, wherein the configuration element is a graphic element.

18. An apparatus as defined in claim 10, wherein the process corresponding to the first one of the second control module identifiers is to execute in a controller to control the physical device in the distributed-equipment process control system, the controller being separate from the apparatus and the physical device.

19. A method to update a binding reference in a process control system, the method comprising:
 retrieving an updated binding reference associated with a graphical configuration element representative of a physical device of a distributed-equipment process control system, the updated binding reference having an updated control module identifier identifying a process control module bound to the graphical configuration element to control the physical device, the updated control module identifier provided to the updated binding reference while the graphical configuration element is not loaded in a graphic editor;
 loading the graphical configuration element and an outdated control module identifier for displaying in the graphic editor, the outdated control module identifier having an outdated binding with the graphical configuration element; and
 when preparing to display the graphical configuration element in the graphic editor, replacing the outdated control module identifier with the updated control module identifier of the updated binding reference without user intervention to bind the updated control module identifier with the graphical configuration element.

20. A method as defined in claim 19, wherein loading the graphical configuration element includes retrieving a memory model of the graphical configuration element from a local memory associated with the graphic editor.

21. A method as defined in claim 19, wherein the outdated control module identifier represents an outdated identifier previously used to identify the process control module.

22. A method as defined in claim 19, wherein the graphical configuration element is loaded in response to a user request to load the graphical configuration element.

23. A method as defined in claim 19, further comprising storing a binding reference identifier associated with the graphical configuration element in a list of binding references to indicate that the outdated control module identifier associated with the configuration element is potentially outdated.

24. A method as defined in claim 23, further comprising retrieving the updated control module identifier of the updated binding reference based on the binding reference identifier stored in the list of binding references.

\* \* \* \* \*